United States Patent
Kim et al.

(10) Patent No.: US 10,440,621 B2
(45) Date of Patent: Oct. 8, 2019

(54) CHANGING METHOD OF A COMMUNICATION MODE AND AN ELECTRONIC DEVICE SUPPORTING THE SAME

(71) Applicant: Samsung Electronics Co., Ltd., Gyeonggi-do (KR)

(72) Inventors: Hye Jeong Kim, Gyeonggi-do (KR); Yun Sang Park, Gyeonggi-do (KR); Sung Jin Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 159 days.

(21) Appl. No.: 14/753,812

(22) Filed: Jun. 29, 2015

(65) Prior Publication Data

US 2015/0382261 A1    Dec. 31, 2015

(30) Foreign Application Priority Data

Jun. 27, 2014    (KR) ........................ 10-2014-0080123

(51) Int. Cl.
     *H04W 36/12*      (2009.01)
     *H04W 76/20*      (2018.01)
     (Continued)

(52) U.S. Cl.
     CPC ........... *H04W 36/12* (2013.01); *H04W 76/20* (2018.02); *H04W 72/1215* (2013.01); *H04W 88/06* (2013.01)

(58) Field of Classification Search
     CPC ..... H04W 36/12; H04W 76/04; H04W 88/06; H04W 72/1215
     See application file for complete search history.

(56) References Cited

U.S. PATENT DOCUMENTS

| | | |
|---|---|---|
| 5,745,695 A | 4/1998 | Gilchrist et al. |
| 7,916,715 B2 | 3/2011 | Rezaiifar et al. |
| | (Continued) | |

FOREIGN PATENT DOCUMENTS

| | | |
|---|---|---|
| CN | 102037762 | 4/2011 |
| KR | 1020130033881 | 4/2013 |
| | (Continued) | |

OTHER PUBLICATIONS

International Search Report dated Sep. 23, 2015 issued in counterpart application No. PCT/KR2015/006556, 3 pages.

(Continued)

*Primary Examiner* — Peter P Chau
(74) *Attorney, Agent, or Firm* — The Farrell Law Firm, P.C.

(57) ABSTRACT

Methods and devices are provided for operating a communication service. A communication control module of the electronic device transmits information related to operation of a circuit switching service to a network device supporting a packet switching service through a communication interface. The communication control module switches radio resources of the communication interface between the packet switching service and the circuit switching service based on the information related to the operation of the circuit switching service. The information related to the operation of the circuit switching service is transmitted to the network device via a communication system module related to the packet switching service.

11 Claims, 9 Drawing Sheets

(51) Int. Cl.
*H04W 72/12* (2009.01)
*H04W 88/06* (2009.01)

(56) References Cited

U.S. PATENT DOCUMENTS

| | | | |
|---|---|---|---|
| 8,279,834 B2 | 10/2012 | Mildh | |
| 9,014,090 B2 | 4/2015 | Mildh | |
| 9,736,736 B2 | 8/2017 | Mildh | |
| 2001/0049731 A1* | 12/2001 | Kuusinen | H04L 47/10 709/223 |
| 2004/0120283 A1 | 6/2004 | Rezaiifar et al. | |
| 2005/0220079 A1* | 10/2005 | Asokan | H04W 76/025 370/352 |
| 2007/0183394 A1 | 8/2007 | Khandelwal et al. | |
| 2008/0069084 A1* | 3/2008 | den Hartog | H04M 7/0057 370/352 |
| 2009/0116447 A1* | 5/2009 | Balasubramanian | H04W 36/14 370/331 |
| 2009/0285157 A1* | 11/2009 | Yeoum | H04W 92/02 370/328 |
| 2011/0080867 A1 | 4/2011 | Mildh | |
| 2012/0270545 A1 | 10/2012 | Zhao et al. | |
| 2013/0010696 A1 | 1/2013 | Mildh | |
| 2013/0267267 A1 | 10/2013 | Mujtaba et al. | |
| 2013/0287139 A1* | 10/2013 | Zhu | H04N 21/2365 375/295 |
| 2015/0023284 A1 | 1/2015 | Zhao et al. | |
| 2015/0229370 A1* | 8/2015 | Lidian | H04L 1/1861 370/335 |
| 2015/0230138 A1 | 8/2015 | Mildh | |

FOREIGN PATENT DOCUMENTS

| | | |
|---|---|---|
| WO | WO 02/17580 | 2/2002 |
| WO | WO 2013/106033 | 7/2013 |
| WO | WO 2013/151922 | 10/2013 |

OTHER PUBLICATIONS

European Search Report dated Nov. 10, 2015 issued in counterpart application No. 15174032.1-1857, 8 pages.
Chinese Office Action dated Mar. 14, 2019 issued in counterpart application No. 201580034133.3, 15 pages.

* cited by examiner

CHANGING METHOD OF A COMMUNICATION MODE AND AN ELECTRONIC DEVICE SUPPORTING THE SAME

PRIORITY

This application claims priority under 35 U.S.C. § 119(a) to a Korean Patent Application filed on Jun. 27, 2014 in the Korean Intellectual Property Office and assigned serial number 10-2014-080123, the content of which is incorporated herein by reference.

BACKGROUND

1. Field of the Disclosure

The present disclosure relates to a communication service operation of an electronic device.

2. Description of the Related Art

When an electronic device does not simultaneously support a packet switching (PS) service and a circuit switching (CS) service, the electronic device may access a specific system based on a specific communication method. For example, the electronic device may simultaneously access a system that supports the PS service and a system that supports the CS service through a dual radio (i.e. the electronic device is provided with a radio module configured to provide two or more radio communication connections in parallel). Alternatively, the electronic device may alternately access systems supporting the CS service and the PS service, or may restrictively simultaneously access the two systems through single radio. Since a single-radio electronic device does not simultaneously support a PS (e.g. data) service and a CS (e.g. voice) service, it is unable to use a data service (i.e. a PS service) when a voice call is operated. Furthermore, the single-radio electronic device should periodically monitor CS paging in order to process an incoming CS call when a data service is provided.

The single-radio electronic device periodically uses a radio frequency (RF) module for the purpose of paging monitoring or measurement in relation to use of a CS service while a PS service is provided. This use of the RF module may cause communication performance degradation. For example, RF module use for paging monitoring and measurement may decrease a long term evolution (LTE) data transmission/reception rate, cause a release of an LTE communication channel, or cause occurrence of errors such as radio link failure (RLF) and out of service (OOS).

SUMMARY

The embodiments described herein have been made to address at least the above problems and/or disadvantages and to provide at least the advantages described below. Accordingly, an aspect of the present disclosure provides a communication service operating method for preventing performance degradation of a PS system (e.g., LTE) while using a CS system (e.g. a system providing a code division multiple access (CDMA) communication service), and an electronic device supporting the same.

In accordance with an embodiment of the present disclosure, an electronic device is provided that includes a communication interface configured to support operation of a radio resource. The electronic device also includes a communication control module configured to control operation of at least one of a packet switching service and a circuit switching service based on the communication interface.

The communication control module includes a first communication system module supporting the packet switching service, and a second communication system module supporting the circuit switching service. The second communication system module is configured to transfer information related to the operation of the circuit switching service to the first communication system module, and the first communication system module is configured to transmit the information related to the operation of the circuit switching service to a network device supporting the packet switching service. The communication control module is further configured to switch the radio resource between the packet switching service and the circuit switching service based on the information related to the operation of the circuit switching service.

In accordance with another embodiment of the present disclosure, a method is provided for operating a communication service in an electronic device. A communication control module of the electronic device transmits information related to operation of a circuit switching service to a network device supporting a packet switching service through a communication interface. The communication control module switches radio resources of the communication interface between the packet switching service and the circuit switching service based on the information related to the operation of the circuit switching service. The information related to the operation of the circuit switching service is transmitted to the network device via a communication system module related to the packet switching service.

In accordance with another embodiment of the present disclosure, a computer-readable recording medium is provided for storing computer-readable instructions to be executed by at least one processor. The instructions are configured to perform transmitting, by a communication control module of the electronic device, information related to operation of a circuit switching service to a network device supporting a packet switching service through a communication interface; and switching, by the communication control module, radio resources of the communication interface between the packet switching service and the circuit switching service based on the information related to the operation of the circuit switching service. The information related to the operation of the circuit switching service is transmitted to the network device via a communication system module related to the packet switching service.

In accordance with another embodiment of the present disclosure, a method is provided for operating a communication service in a network device. The network device receives information related to operation of a circuit switching service from an electronic device through a communication interface. The network device supports a packet switching service. The network device switches radio resources of the communication interface between the packet switching service and the circuit switching service based on the information related to the operation of the circuit switching service. The information related to the operation of the circuit switching service is received at the network device via a communication system module of the electronic device related to the packet switching service.

Embodiments of the present disclosure provide methods and devices in which operation is switched between a packet switching service and a circuit switching service based on the transmission of information related to operation of the circuit switching service from a communication system module of the electronic device related to the packet switching service, to a network device supporting the packet switching service.

BRIEF DESCRIPTION OF THE DRAWINGS

The above and other aspects, features, and advantages of the embodiments of the present disclosure will be more apparent from the following detailed description when taken in conjunction with the accompanying drawings, in which.

DETAILED DESCRIPTION

Figure 1:
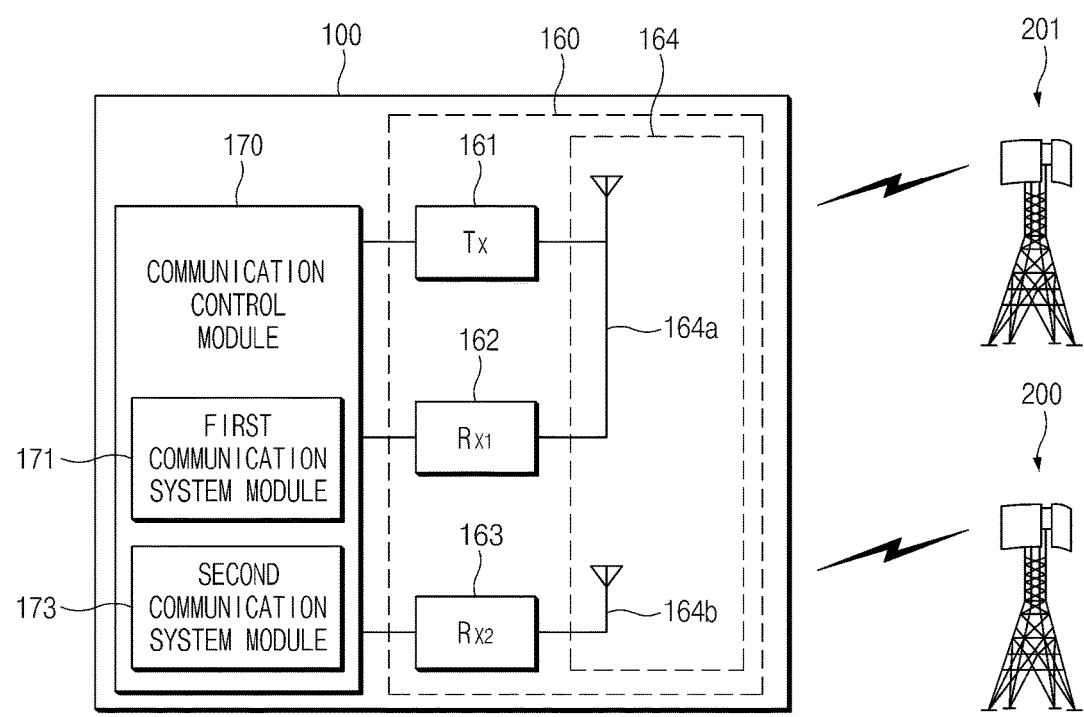
FIG. 1 is a diagram illustrating a communication service operation environment, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the embodiments described herein.

The terms "include," "comprise," "including," or "comprising", as used herein, indicate described functions, operations, or existence of elements, but does not exclude other functions, operations, or elements. It should be further understood that the terms "include", "including", "comprise", "comprising", "have", or "having", as used herein, specify the presence of stated features, numbers, operations, elements, components, or combinations thereof, but do not preclude the presence or addition of one or more other features, numbers, operations, elements, components, or combinations thereof.

The meaning of the terms "or" or "at least one of A and/or B", as used herein, include any and all combinations of words listed together with the term. For example, the wording "A or B" or "at least one of A and/or B" may indicate A, B, or both A and B.

Terms such as "first", "second", and the like, as used herein, may refer to various elements of various embodiments of the present disclosure, but do not limit the elements. For example, such terms do not limit the order and/or priority of the elements. Furthermore, such terms may be used to distinguish one element from another element. For example, a first user device and a second user device indicate different user devices. For example, without departing from the scope of the present disclosure, a first element may be referred to as a second element, and similarly, a second element may be referred to as a first element.

It will be understood that when an element is referred to as being "connected" or "coupled" to another element, it can be directly connected or coupled to the other element, or intervening elements may be present. In contrast, when an element is referred to as being "directly connected" or "directly coupled" to another element, it should be understood that there are no intervening elements.

The terminology used herein is not for limiting the present disclosure but for describing specific various embodiments of the present disclosure. The terms of a singular form may include plural forms unless otherwise specified.

The terms used herein, including technical or scientific terms, have the same meanings as understood by those skilled in the art unless otherwise defined herein. Commonly used terms, such as those defined in a dictionary, should be interpreted in the same context as in the related art and should not be interpreted in an idealized or overly formal sense unless otherwise explicitly defined.

Electronic devices, according to various embodiments of the present disclosure, may have a communication function. For example, the electronic devices may be embodied as at least one of smartphones, tablet personal computers (PCs), mobile phones, video telephones, electronic book readers, desktop PCs, laptop PCs, netbook computers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (e.g., head-mounted-devices (HMDs) such as electronic glasses, electronic apparel, electronic bracelets, electronic necklaces, electronic appcessories, electronic tattoos, or smart watches).

According to various embodiments of the present disclosure, the electronic devices may be embodied as smart home appliances having a communication function. The smart home appliances may include at least one of, for example, televisions (TVs), digital versatile disc (DVD) players, audio players, refrigerators, air conditioners, cleaners, ovens, microwave ovens, washing machines, air cleaners, set-top boxes, TV boxes, game consoles, electronic dictionaries, electronic keys, camcorders, electronic picture frames, or the like.

Hereinafter, electronic devices and image processing of the electronic devices, according to various embodiments of the present disclosure, will be described with reference to the accompanying drawings. The term "user", as used herein, may refer to a person who uses an electronic device (e.g., a camera) or may refer to a device (e.g., an artificial electronic device) that uses the electronic device.

FIG. 1 is a diagram illustrating a communication service operation environment, according to an embodiment of the present disclosure.

Referring to FIG. 1, the communication service operation environment includes an electronic device 100 and network devices 200 and 201. The electronic device 100 has a communication interface 160 that provides a transmission path and a plurality of reception paths.

The electronic device 100 may support a communication service based on a PS network (e.g., a PS service) and a communication service based on a CS network (e.g., a CS service). The network device 200 may provide a PS service (e.g., LTE communication), and the network device 201 may provide a CS service (e.g., CDMA communication). The term "network device" thus includes devices that provide base station services such as evolved Node Bs (eNB) in an LTE network.

If the electronic device 100 has subscribed to a specified communication service and enters a coverage area of the network device 200, the electronic device 100 may perform a camping operation on the network device 200 so as to perform base station registration. In this operation, device information of the electronic device 100 (e.g., information on communication methods supportable by the electronic device 100, such as, for example, single radio, dual radio, single radio type 1, single radio type 2, or the like) may be transmitted to the network device 200. The "single radio type 1" and "single radio type 2" communication methods mentioned above refer to respective different methods of using a transceiver for a CS system operation (e.g., CS paging monitoring or the like) during a process (or mode) of accessing a PS system (e.g., an LTE system) by the electronic device 100 using a single radio. Communication methods described in relation to various embodiments of the present disclosure are not, however, limited to the names of the above-described communication methods.

According to the single radio type 1, the electronic device 100 receives a CS signal using one reception path alone when a receiving function alone is required (e.g., in the case of monitoring CS paging or measuring a signal strength of an adjacent base station) during CS system operation. The electronic device 100 is able to simultaneously perform LTE communication using a transmission path and the other one reception path. According to the single radio type 1, if the CS system operation requires transmission (e.g., for registration), the electronic device 100 may be unable to perform LTE communication during an interval of the CS system operation.

According to the single radio type 2, the electronic device 100 uses two reception paths for the CS system operation, and may be unable to perform LTE communication during the interval of the CS system operation.

According to an embodiment of the present disclosure, when the electronic device 100 accesses another network device (e.g., another evolved Node B (eNB) in an LTE network) through reselection or handover, the device information of the electronic device 100 may be transmitted to the network device 200. According to an embodiment of the present disclosure, the electronic device 100 may add the device information to a radio resource control (RRC) message or a medium access control (MAC) message to transmit the device information to the network device, or may individually transmit the device information to the network device.

According to an embodiment of the present disclosure, the electronic device 100 may transmit CS system operation information (e.g., channel quality indicator (CQI) or rank indicator (RI) information, start and completion times of the CS system operation, information on whether LTE communication is enabled during the interval of the CS system operation, or the like) to the network device 200 in a PS system access mode.

According to various embodiments of the present disclosure, the electronic device 100 may transmit a specified indicator related to a supported communication method to the network device 200. According to an embodiment of the present disclosure, the electronic device 100 may transmit (or report), to the network device 200, CQI/RI information providing a notification of information on the CS system operation, at a required time regardless of a period specified by the network device 200. According to an embodiment of the present disclosure, the electronic device 100 may transmit the CQI/RI information before a specified time has elapsed: the specific time may be, for example, a time required for the network device 200 to receive the CQI/RI information and accordingly perform a required operation such as LTE communication mode change (e.g., in the region of 4 ms to 8 ms). The electronic device 100 may pre-estimate and transmit the CQI/RI information (determined at a time other than a time at which the CQI/RI information is transmitted) of the interval of performing the CS system operation.

According to various embodiments of the present disclosure, the electronic device 100 may transmit a specified indicator at a specified timing or repeatedly. According to an embodiment of the present disclosure, the electronic device 100 may simultaneously or selectively support a first communication service (e.g., a PS service or an LTE communication service) and a second communication service (e.g., a CS service or a code division multiple access (CDMA) communication service). In this environment, the electronic device 100 may transmit, to the network device 200, a specified indicator for controlling an operation of the second communication service (e.g., CS paging monitoring, CS channel measurement, or the like), which periodically or intermittently occurs during operation of the first communication service (e.g., establishment of an LTE communication channel to the network device 200).

According to an embodiment of the present disclosure, the electronic device 100 may transmit, to the network device 200, a specified indicator before a specified time has elapsed: the specified time being, for example, a time taken for the network device 200 and the electronic device 100 to receive the specified indicator and perform a control operation such as changing a communication mode of the PS service or suspending the PS service according to the specified indicator (e.g. in the region of 4 msto 8 ms). After transmitting the specified indicator to the network device 200, the electronic device 100 may perform second communication service processing (e.g., CS communication function processing) at a corresponding timing (arrival of a time of CS service-related processing).

According to various embodiments of the present disclosure, at the time of CS system operation, the electronic device 100 may transmit, to the network device 200, at least one of a first indicator related to an operation mode of the CS system, a second indicator related to an operation time of the CS system, a third indicator for requesting change of an LTE communication mode corresponding to the operation of the CS system, or a fourth indicator for requesting control of LTE communication corresponding to the operation of the CS system.

The operation mode of the CS system may be divided into a mode in which PS communication is enabled using a transmitter and one receiver at the time of CS system operation, and a mode in which PS communication is disabled at the time of CS system operation.

The operation time of the CS system may be divided into a CS system operation start time (or a time that is sufficiently prior to the operation time of the CS system in consideration of a time taken for the network device 200 to perform required control) and a CS system operation completion time.

The request for change of the LTE communication mode (or state, function, operation, or process) corresponding to the CS system operation may be divided into a request for change from a rank 2 mode (or state, function, operation, or process) to a rank 1 mode (or state, function, operation, or process) and a request for change from the rank 1 mode to the rank 2 mode. In the LTE system of the electronic device 100, it is almost impossible to receive data normally using a single receiver in the rank 2 mode. Data is able to be received using the single receiver in the rank 1 mode, but data throughput may be reduced compared to that of the rank 2 mode. The term "rank" here refers to a class of LTE communication mode and indicates the number of independent, simultaneous data streams that can be transmitted by the network device in a given LTE transmission mode. The Rank Indicator (RI) corresponds to an indication of the rank preferred by the electronic device.

The control of the LTE communication may be divided into suspending of LTE data transmission/reception and resuming of the LTE data transmission/reception. The suspending of the LTE data transmission/reception may represent the suspension of actual transmission/reception of data between the network device 200 and the electronic device 100 while a connection therebetween is maintained. The network device 200 may buffer data to be sent to the electronic device 100, during an interval in which the data transmission/reception is suspended. The resumption of the LTE data transmission/reception may represent that the previously suspended data transmission/reception is resumed.

According to an embodiment of the present disclosure, when the electronic device 100 supports the single radio type 1, the electronic device 100 may transmit, to the network device 200, the operation mode, the operation start time, and the operation completion time of the CS system using the first and second indicators. The network device 200 may control an operation, such as, for example, communication mode determination, using corresponding information (the first or second indicator). According to another embodiment of the present disclosure, when the electronic device 100 supports the single radio type 1, the electronic device 100 may directly request operation control of a network device using the third or fourth indicator.

According to another embodiment of the present disclosure, when the electronic device 100 supports the single radio type 2, the electronic device 100 may transmit, to the network device 200, the operation mode, the operation start time, and the operation completion time of the CS system using the first and second indicators. The network device 200 may control an operation, such as, for example, communication mode determination, using corresponding information (the first or second indicator). According to another embodiment of the present disclosure, when the electronic device 100 supports the single radio type 2, the electronic device 100 may directly request operation control of a network device using the fourth indicator.

According to an embodiment of the present disclosure, the electronic device 100 may add at least one of the first, second, third, and fourth indicators to an RRC message or a MAC message to transmit the at least one of the first, second, third, and fourth indicators to the network device 200, or may transmit at least one of the first, second, third, and fourth indicators to the network device 200 using an independent packet (or message).

According to various embodiments of the present disclosure, the electronic device 100 may transmit at least one of the indicators to the network device 200 non-repetitively (i.e. on an ad hoc basis).

According to an embodiment of the present disclosure, the electronic device 100 includes communication interface 160 and a communication control module 170, as illustrated in FIG. 1. The communication interface 160 includes an antenna module 164, at least one transmitter 161, and a plurality of receivers 162 and 163.

The antenna module 164 includes a plurality of antennas 164a and 164b. The antenna 164a is connected to the transmitter 161 and the receiver 162. The antenna 164b is connected to the receiver 163. Although FIG. 1 illustrates that one antenna is connected to one transmitter or receiver, various embodiments of the present disclosure are not limited thereto. For example, according to various embodiments of the present disclosure, the antennas 164a and 164b may be cross-connected to the receivers 162 and 163. Furthermore, according to various embodiments of the present disclosure, the antennas 164a and 164b may be cross-connected to the transmitter 161 and the receivers 162 and 163. Moreover, according to various embodiments of the present disclosure, antennas respectively connected to the transmitter 161 and the receivers 162 and 163 may be arranged.

The transmitter 161 may be connected to one or more antennas. The transmitter 161 may transmit transmission data to the network device 200 as controlled by the communication control module 170. According to an embodiment of the present disclosure, the transmitter 161 may be operated in relation to the first communication service (i.e. an LTE communication service) and the second communication service (i.e. a CS service) according to a communication method supported by the electronic device 100.

According to an embodiment of the present disclosure, the transmitter 161 may transmit a specified indicator or CQI/RI information related to CS service operation. For example, as controlled by the communication control module 170, the transmitter 161 may add at least one of the first indicator related to the operation mode of the CS system, the second indicator related to the operation start time and operation completion time of the CS system, the third indicator for requesting change of a packet switching communication mode, and the fourth indicator for requesting control of a packet switching data service to a specific message to transmit the at least one of the first, second, third, and fourth indicators to the network device 200, or may transmit the at least one of the first, second, third, and fourth indicators to the network device 200 using an independent packet (or message).

The receiver 162 is connected to the antenna 164a (or an additional antenna separate from a first antenna) so as to be used for supporting a specific communication service or a plurality of communication services, according to a communication method supported by the electronic device 100.

The receiver 163 is connected to the antenna 164b so as to be used for supporting a specific communication service or a plurality of communication services, according to a communication method supported by the electronic device 100. The communication control module 170 may control the transmitter 161 and the receivers 162 and 163 (e.g., control switching of the transmitter and the receivers) so that data is transmitted/received according to a specific communication method of the electronic device 100.

According to various embodiments of the present disclosure, the communication control module 170 includes a first communication system module 171 and a second communication system module 173. The first communication system module 171 may include, for example, at least one of a programming module, a communication module, and a processor related to PS service operation. The second communication system module 173 may include, for example, at least one of a programming module, a communication module, and a processor related to CS service operation. The first communication system module 171 may transmit data during a PS service operation period. The second communication system module 173 may perform paging monitoring, channel inspection, measurement, and CS service processing during a CS service operation period.

According to an embodiment of the present disclosure, the second communication system module 173 may transfer, to the first communication system module 171, use information (e.g., information on the operation mode of the CS system, information on arrival of an operation period or operation completion of the CS service, or the like) on radio resources (e.g., a radio frequency (RF)). The first communication system module 171 may then transmit, to the network device 200, the estimated CQI/RI information and at least one of the first, second, third, and fourth indicators, in consideration of a communication method (e.g., single radio type 1 or single radio type 2) of the electronic device 100 and a current status (e.g., a connected or idle mode, a transmission mode (TM), or rank) of the first communication system module 171. According to various embodiments of the present disclosure, the first communication system module 171 may provide status information (e.g., a connected or idle mode) to the second communication system module 173. Then, the second communication system module 173 may provide radio resource use information to the first communication system module 171 using the status information, when it is required to provide information related to CS service processing. According to various embodiments of the present disclosure, the communication control module 170 may be designed so as to transmit data between the first communication system module 171 and the second communication system module 173. For example, upon receiving RF use information from the second communication system module 173, the communication control unit 170 may transfer the RF use information to the first communication system module 171. Upon receiving the status information from the first communication system module 171, the communication control module 170 may transfer the status information to the second communication system module 173.

If the electronic device 100 enters a coverage area of the network device 200, the network device 200 may support a base station registration process of the electronic device 100. The network device 200 may receive, from the electronic device 100, operation information of the electronic device 100 and specified indicators corresponding to a specific communication service request. For example, the network device 200 may receive an indicator for requesting change of a communication mode, once or multiple times. If the network device 200 receives the CQI/RI information from the electronic device 100 at a certain time, the network device 200 may change a communication mode between the network device 200 and the electronic device 100. According to various embodiments of the present disclosure, if the network device 200 receives at least one of the first, second, third, and fourth indicators from the electronic device 100, the network device 200 may change a communication mode (e.g., change of a TM, rank, or the like) between the network device 200 and the electronic device 100 and data service control (e.g., suspending or resuming of a data service). According to various embodiments of the present disclosure, the network device 200 may repeatedly receive at least one of the first, second, third, and fourth indicators. The network device 200 may control a data service and change a communication mode related to communication service processing of the electronic device 100 at the time the at least one indicator is received.

According to various embodiments of the present disclosure, the network device 200 may receive an indicator related to a communication method used (e.g., single radio, single radio type 1, or single radio type 2) from the electronic device 100. The network device 200 may periodically change a communication mode in relation to operation of a CS service periodically requested from the electronic device 100. The network device 200 may pre-store information on a CS service period of the electronic device 100 or may receive the information from the electronic device 100. The network device 200 may support the change of the communication mode of the electronic device 100 in synchronization with the period information.

According to various embodiments of the present disclosure, upon receiving a specific indicator from the electronic device 100, the network device 200 may suspend an LTE data service related to the electronic device 100 (i.e., record a state of an LTE communication service (e.g., a communication method, a bandwidth, a communication mode, or the like) connected to the electronic device 100 and temporarily suspend LTE communication service support). Upon receiving a specific indicator from the electronic device 100, the network device 200 may resume the LTE data service. The network device 200 may support the LTE communication service based on the information recorded in a suspended state. According to an embodiment of the present disclosure, the network device 200 may temporarily suspend the LTE communication service, upon receiving, from the electronic device 100, the second indicator that indicates the operation start time of the CS system or the fourth indicator for requesting suspension of the data service. Furthermore, upon receiving the second indicator that indicates the operation completion time of the CS system or the fourth indicator for requesting resumption of the data service, the network device 200 may provide a communication service while maintaining the state of the communication service (e.g., a high-speed communication channel, or a maximum Modulation and Coding Scheme (MCS) level state, or a maximum throughput (TP)) connected before the temporary suspension.

According to various embodiments of the present disclosure, an electronic device according to an embodiment of the present disclosure may include a communication interface including a radio resource related to support of a communication service, and a communication control module configured to control operation of at least one of a packet switching service or a circuit switching service on the basis of the communication interface such that information related to the operation of the circuit switching service is transmitted to a network device.

According to various embodiments of the present disclosure, the communication control module may include a first communication system module supporting the packet switching service and a second communication system module supporting the circuit switching service.

According to various embodiments of the present disclosure, the second communication system module may transmit the information related to the operation of the circuit switching service to the network device via the first communication system module.

According to various embodiments of the present disclosure, the second communication system module may transfer the information related to the operation of the circuit switching service to the first communication system module in response to an active state of the first communication system module.

According to various embodiments of the present disclosure, the communication control module may perform control so that radio resource use start information related to the operation of the circuit switching service or radio resource use completion information related to completion of the operation of the circuit switching service is transmitted to the network device.

According to various embodiments of the present disclosure, the communication control module may perform control so that information for requesting communication mode change of the packet switching service or at least one of an indicator for indicating start of the operation of the circuit switching service or an indicator for indicating completion of the operation of the circuit switching service is transmitted to the network device.

According to various embodiments of the present disclosure, the communication control module may handle the communication mode change of the packet switching service.

According to various embodiments of the present disclosure, the communication control module may perform control so that a quality of a communication mode is downgraded according to communication mode change information of the network device after the radio resource use start information is transmitted, and may perform control so that the quality of the communication mode is upgraded according to the communication mode change information of the network device after the radio resource use completion information is transmitted.

According to various embodiments of the present disclosure, the communication control module may control radio resource switching of the communication interface in relation to the operation of the circuit switching service of the second communication system after the radio resource use start information is transmitted, and may control the resource switching of the communication interface in relation to the operation of the packet switching service of the first communication system after the radio resource use completion information is transmitted.

According to various embodiments of the present disclosure, the communication control module may request a suspended state of the packet switching service from the network device when the circuit switching service is used.

According to various embodiments of the present disclosure, the communication interface may include one transmitter and a first receiver using a main antenna and a second receiver using a sub antenna.

Figure 2A:
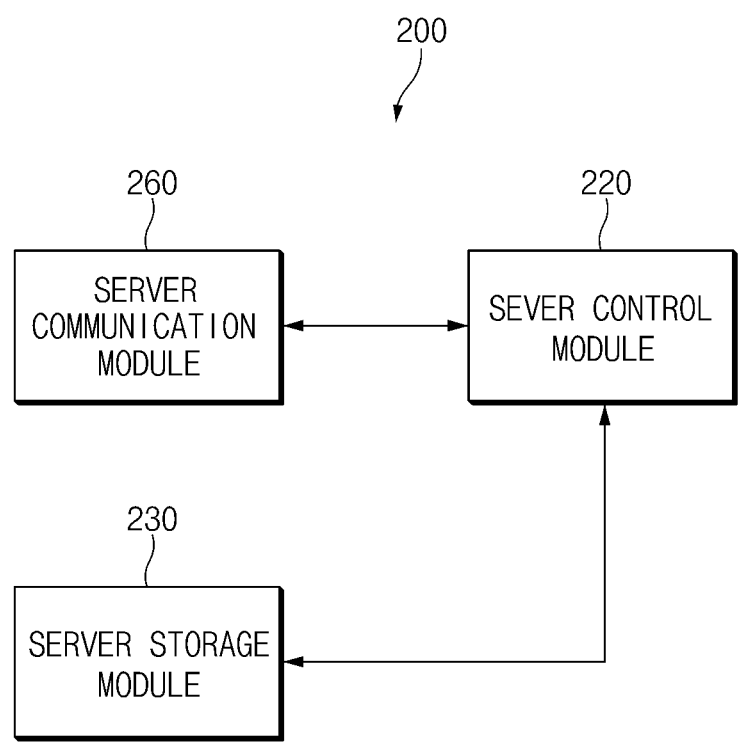
FIG. 2A is a schematic diagram illustrating a network device, according to an embodiment of the present disclosure.

FIG. 2A is a diagram illustrating a network device, according to an embodiment of the present disclosure.

Referring to FIG. 2A, the network device 200 includes a server communication module 260, a server storage module 230, and a server control module 220.

The server communication module 260 may establish a communication channel with the electronic device 100 via a base station or the like. According to an embodiment of the present disclosure, the server communication module 260 may establish a communication channel with the electronic device 100 related to a PS service (e.g., an LTE communication service). The server communication module 260 may change a communication mode (e.g., change of a TM, rank, or the like) for a connection to the electronic device 100, as controlled by the server control module 220. The server communication module 260 may receive, from the electronic device 100, specified indicators or CQI/RI information including, for example, a transmission mode rank indicator. The server communication module 260 may provide, to the server control module 220, at least one of the indicators or the information received, and identification information of the electronic device 100.

The server storage module 230 may temporarily or semi-permanently store the identification information of the electronic device 100 and the indicators transmitted from the electronic device 100. The indicators and the identification information of the electronic device 100 stored in the server storage module 230 may be provided to the server control module 220 when the electronic device 100 is registered in a specific base station. According to various embodiments of the present disclosure, when the electronic device 100 is configured to temporarily or repetitively provide a specified indicator to an accessed base station, the server storage module 230 may not store additional indicator information.

The server control module 220 may control the server communication module 260 to perform registration of the specific electronic device 100. The server control module 220 may check information (e.g., at least one of a specified indicator, CQI/RI information, or a used communication method) provided from the electronic device 100 so as to change a communication mode of the electronic device 100. For example, the server control module 220 may control the communication mode change of the electronic device 100, upon receiving, from the electronic device 100, the CQI/RI information for requesting rank 1, the second indicator for notifying of the start of operation of the CS system, or the third indicator for requesting a communication mode change into rank 1. According to an embodiment of the present disclosure, if the electronic device 100 currently uses a communication channel of the rank 2 mode (such as LTE transmission mode (TM) 3 or 4 based on spatial multiplexing (SM)), the server control module 220 may change the communication channel from the rank 2 mode to the rank 1 mode. Alternatively, the server control module 220 may change the method of using the communication channel of the rank 2 mode into a space frequency blocking code (SFBC)-based communication mode or diversity mode. After changing the transmission mode or rank, the server control module 220 may provide information on a changing process to the electronic device 100. According to various embodiments of the present disclosure, if the electronic device 100 uses a communication channel based on LTE TM 2 SFBC or a communication channel of the rank 1 mode, the server control module 220 may maintain a current state.

According to various embodiments of the present disclosure, the server control module 220 may change the communication channel of the rank 1 mode into the rank 2 mode, upon receiving, from the electronic device 100, the CQI/RI information for requesting the rank 2 mode, the second indicator for notifying operation completion of the CS system, or the third indicator for requesting communication mode change into the rank 2 mode. The server control module 220 may provide information on a rank change to the electronic device 100. Through the above-described operation control, the server control module 220 and the electronic device 100 may prevent occurrence of an error in data transmission/reception through the communication channel of the rank 2 mode while the electronic device 100 processes the CS service.

Figure 2B:
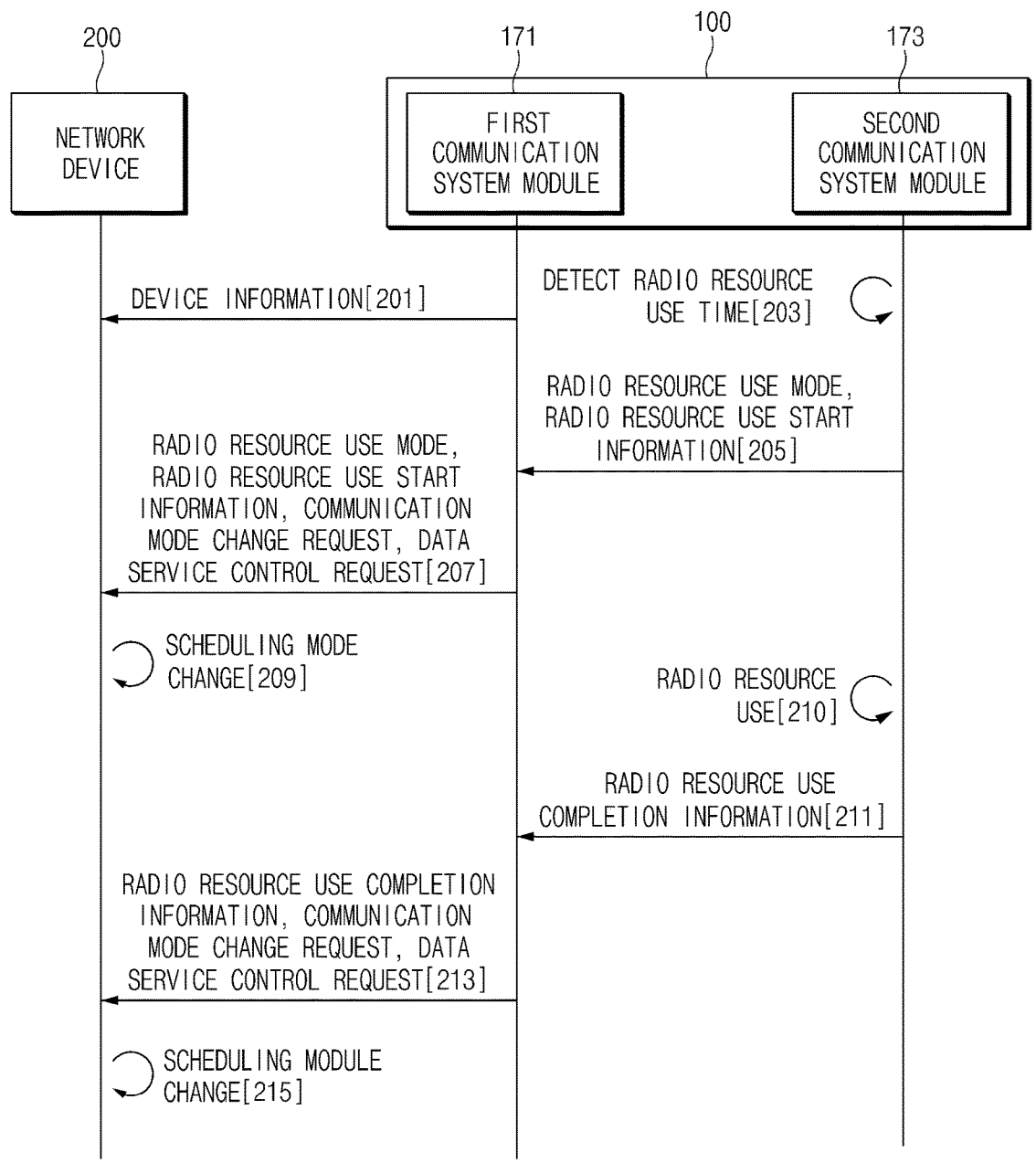
FIG. 2B is a diagram illustrating a signal flow related to communication mode change, according to an embodiment of the present disclosure.

FIG. 2B is a diagram illustrating a signal flow related to communication mode change, according to an embodiment of the present disclosure.

Referring to FIG. 2B, the first communication system module 171 of the electronic device 100 transmits device information to the network device 200, in step 201. The electronic device 100 may be in a state in which it is supplied with power or is positioned within a coverage area of a specific base station. The electronic device 100 may provide, to the network device 200, the device information corresponding to a communication method of the electronic device 100 (e.g., a communication method of selectively operating a PS service and a CS service using one transmission path and two reception paths).

In step 203, the second communication system module 173 detects a time for using a radio resource. For example, the second communication system module 173 may check whether a paging monitoring period (e.g., about 5.12 msec interval) related to CS service support has arrived. Alternatively, the second communication system module 173 may check whether there is a request for a channel search or measurement related to CS service support. Alternatively, the second communication system module 173 may check whether there is a request for registration. If the paging monitoring period arrives or one of the above-described requests is made, the second communication system module 173 transfers, to the first communication system module 171, information on a radio resource use mode (e.g., information on whether a transmitter is used or whether each receiver is used), and radio resource use start information, in step 205. Upon receiving the radio resource use mode and the radio resource use start information, the first communication system module 171 transfers the radio resource use mode and the radio resource use start information to the network device 200, in step 207. As described above, the second communication system module 173 may provide the radio resource use start information to the first communication system module 171 via the communication control module 170.

Upon receiving the radio resource use mode and the radio resource use start information, or a communication mode change request, or a data service control request from the first communication system module 171, the network device 200 changes a scheduling mode (e.g., communication mode change and data service control of the electronic device 100), in step 209. For example, the network device 200 may change a rank of the electronic device 100 (e.g., rank 2->rank 1) or suspend a PS service support state. The second communication system module 173 uses a radio resource at a required time, in step 210. For example, the second communication system module 173 may perform handling of paging monitoring related to a CS service using the receiver 163 or the communication interface 160. If there is a request for a call connection, the second communication system module 173 may process a function related to the call connection based on the communication interface 160.

If radio resource use is completed at the second communication system module 173, the second communication system module 173 transmits radio resource completion information to the first communication system module 171, in step 211. In step 213, the first communication system module 171 transmits the radio resource use completion information, the communication mode change request, or the data service control request to the network device 200. In step 215, the network device 200 changes the scheduling mode (e.g., communication mode change or data service control of a corresponding electronic device). For example, the network device 200 may perform rank change (e.g., rank 1->rank 2). Alternatively, the network device 200 may recover a PS service support state that has been suspended. According to an embodiment of the present disclosure, the network device 200 may handle data transmission/reception while maintaining an LTE transmission condition (e.g., TP, MCS level, or the like) previous to the change of the scheduling mode.

Figure 3:
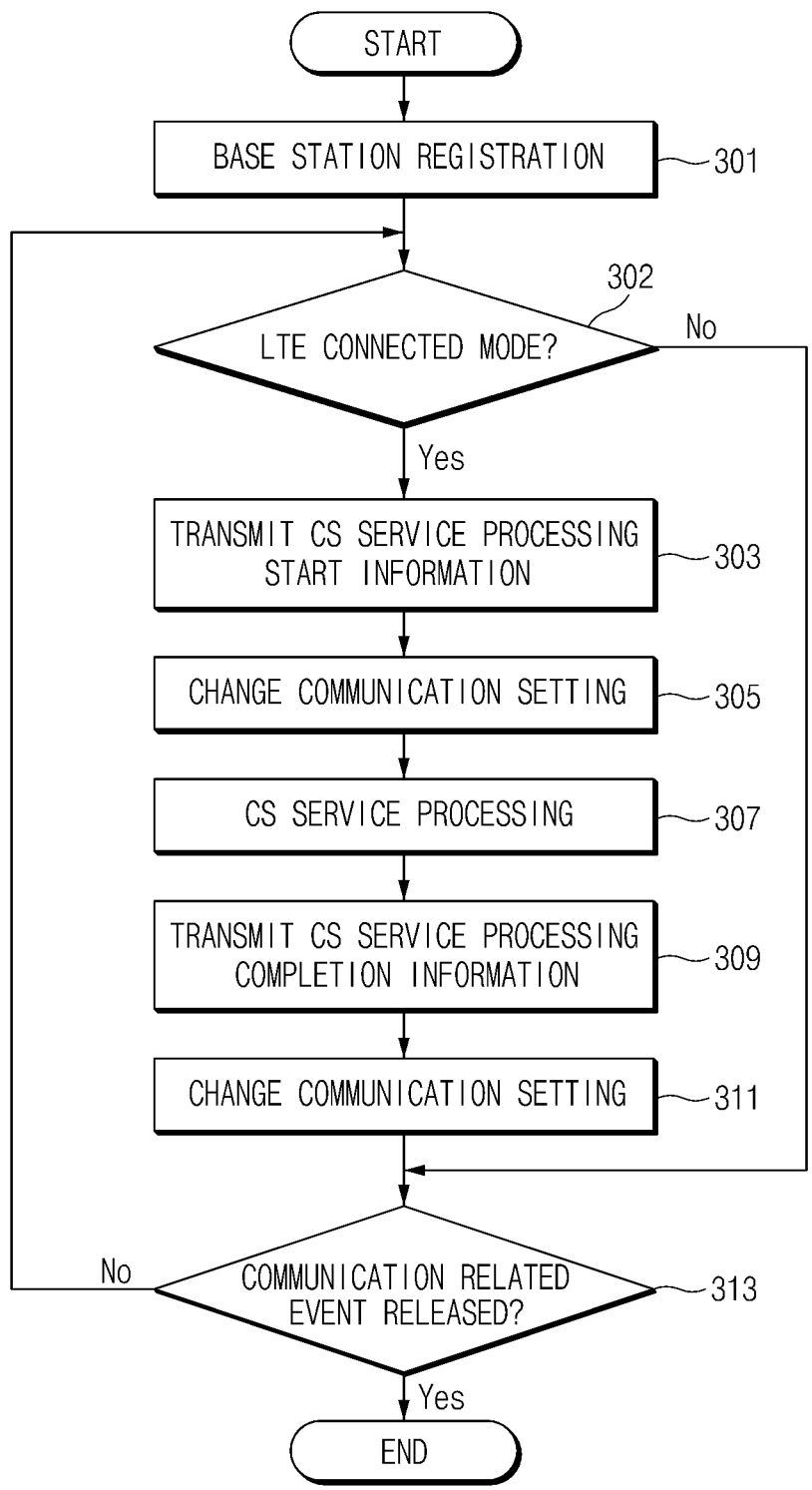
FIG. 3 is a flowchart illustrating a communication service operating method of an electronic device, according to an embodiment of the present disclosure.

FIG. 3 is a flowchart illustrating a communication service operating method of an electronic device, according to an embodiment of the present disclosure.

Referring to FIG. 3, according to a communication service operating method of an electronic device, the electronic device 100 performs registration of a base station, in step 301. For example, if power is supplied after being cut off, or the electronic device 100 enters an area in which a specific communication service is supported, or a specified event occurs, the electronic device 100 may perform a periphery scanning process. If a base station that supports a communication service to which the electronic device 100 has subscribed is discovered, the electronic device 100 may perform a registration process with respect to the base station. According to an embodiment of the present disclosure, the electronic device 100 may transmit identification information thereof to the network device 200, via the base station. The electronic device 100 may receive, from the network device 200, information on an operation of a communication service provided by the network device 200. According to an embodiment of the present disclosure, the electronic device 100 may be registered for an LTE communication service in the network device 200, based on at least one of the transmitter 161, the receiver 162, or the receiver 163. The electronic device 100 determines whether an LTE connected mode is required, in step 302. If the LTE connected mode is required, the electronic device 100 establishes an LTE communication channel with the network device 200. If the LTE connected mode is not required, the process proceeds to step 313.

In step 303, the electronic device 100 transmits, to the network device 200, pieces of information related to starting CS service processing. According to an embodiment of the present disclosure, the electronic device 100 that supports a specific communication method (e.g., single radio type 1 or single radio type 2) may perform a CS service (e.g., paging monitoring, channel inspection, channel measurement, or the like) together with operation of an LTE communication channel at a constant period. In relation to this operation, the electronic device 100 may transmit corresponding information (e.g., information on starting, or completion of, service processing) to the network device 200 at a specified time.

In step 305, the electronic device 100 changes a communication setting. If the network device 200 changes a communication mode after the corresponding information (e.g., service processing information) is transmitted to the network device 200, the electronic device 100 may change the communication setting in response to the change of the communication mode. According to an embodiment of the present disclosure, if the network device 200 changes the communication mode from the rank 2 mode to the rank 1 mode, the electronic device 100 (e.g., based on the single radio type 1 enabling simultaneous process of an LTE communication service and a CS service) may change its communication setting from a communication setting corresponding to the rank 2 mode into a communication setting corresponding to the rank 1 mode. According to an embodiment of the present disclosure, the operations of steps 305 and 307 may be interchanged.

In step 307, the electronic device 100 performs CS service processing using a required radio resource. For example, the electronic device 100 may process data (e.g., paging information, channel inspection information, or the like) received in relation to a CS service. According to an embodiment of the present disclosure, upon receiving a text message in relation to the CS service, the electronic device 100 may perform notification of reception of the text message, storage of the text message, or the like. According to an embodiment of the present disclosure, upon receiving a voice call in relation to the CS service, the electronic device 100 may provide a notification of reception of the call, rejecting or requesting connection of the call, or the like. According to an embodiment of the present disclosure, operations of steps 305 and 307 may be interchanged.

In step 309, the electronic device 100 transmits, to the network device 200, information related to completion of CS service processing. For example, if performance of a function related to the CS service is completed, the electronic device 100 may transmit information on completion of function performance to the network device 200.

In step 311, the electronic device 100 changes a communication setting. If the communication mode is changed in the network device 200 after step 309 is performed, the electronic device 100 may change a communication setting (e.g., change of a communication channel) related to an LTE communication service. According to an embodiment of the present disclosure, the electronic device 100 based on the single radio type 1 may change a communication setting that has been changed to correspond to a rank 1 channel into a communication setting corresponding to a rank 2 channel. In step 313, the electronic device 100 determines whether an event related to the termination or release of a communication function occurs. If the communication function is maintained, the process returns to step 303 so that the electronic device 100 may re-perform above-described steps 303-313. If the communication function terminates or is released, the methodology of FIG. 3 terminates.

According to various embodiments of the present disclosure, a communication service operating method according to an embodiment of the present disclosure may include transmitting, by a communication control module, at least one of an indicator or information related to operation of a circuit switching service to a network device supporting a packet switching service through a communication interface, and switching, by the communication control module, radio resources of the communication interface in relation to the operation of the circuit switching service.

According to various embodiments of the present disclosure, the transmitting may include any one of transmitting the information related to the operation of the circuit switching service to the network device via a communication system related to the packet switching service and transmitting the information related to the operation of the circuit switching service to the network device via the communication system related to the packet switching service in response to an active state of a communication system supporting the packet switching service.

According to various embodiments of the present disclosure, the transmitting may include transmitting, to the network device, radio resource use start information related to the operation of the circuit switching service or radio resource use completion information related to completion of the operation of the circuit switching service.

According to various embodiments of the present disclosure, the transmitting may include transmitting, to the network device, radio resource use mode information of the circuit switching service or at least one of an indicator indicating start of the operation of the circuit switching service or an indicator indicating completion of the operation of the circuit switching service.

According to various embodiments of the present disclosure, the transmitting may include transmitting, to the network device, information for requesting change of a communication mode of the packet switching service or at least one of an indicator indicating start of the operation of the circuit switching service or an indicator indicating completion of the operation of the circuit switching service.

According to various embodiments of the present disclosure, the transmitting may include transmitting, to the network device, information for requesting change of data service control of the packet switching service or at least one of an indicator indicating start of the operation of the circuit switching service or an indicator indicating completion of the operation of the circuit switching service.

According to various embodiments of the present disclosure, the method may further include handling the change of the communication mode of the packet switching service.

According to various embodiments of the present disclosure, the handling may include any one of downgrading a quality of the communication mode after the radio resource use start information is transmitted and upgrading the quality of the communication mode after the radio resource use completion information is transmitted.

According to various embodiments of the present disclosure, the method may include any one of controlling radio resource switching of the communication interface in relation to the operation of the circuit switching service of a second communication system after the radio resource use start information is transmitted and controlling the resource switching of the communication interface in relation to the operation of the packet switching service of a first communication system after the radio resource use completion information is transmitted.

According to various embodiments of the present disclosure, the transmitting may include any one of transmitting, to the network device, information for requesting a suspended state of the packet switching service when the circuit switching service is used and transmitting, to the network device, information for requesting resuming of the packet switching service suspended when use of the circuit switching service is completed.

Figure 4:
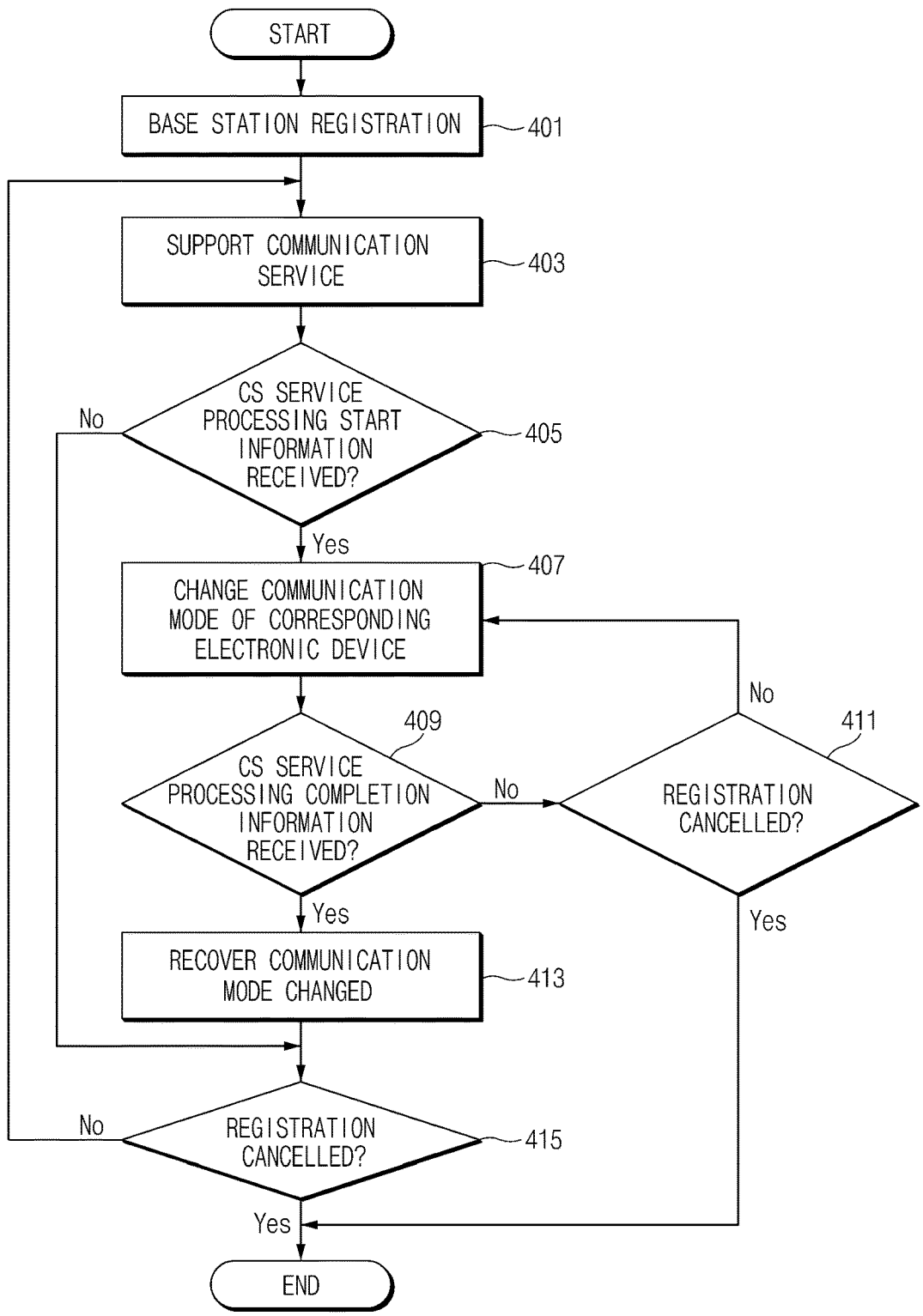
FIG. 4 is a flowchart illustrating a communication mode changing operation of a network device, according to an embodiment of the present disclosure.

FIG. 4 is a flowchart illustrating a communication mode changing operation of a network device, according to an embodiment of the present disclosure.

Referring to FIG. 4, in relation to changing a communication mode of the network device 200, the network device 200 handles base station registration of the electronic device 100, in step 401. For example, the network device 200 may periodically broadcast a certain signal in relation to registration of the electronic device 100. Upon receiving information related to a base station registration request from the specific electronic device 100, the network device 200 may determine validity of the information (e.g., registration request-related information) to perform registration. In step 403, the network device 200 supports a communication service. For example, the network device 200 may establish a PS service-related communication channel with the electronic device 100. Here, the network device 200 may determine a communication mode (e.g., a mode according to a specific TM, rank, SFBC, TP, MCS level, or the like) according to an environment of communication with the electronic device 100 or a communication method supported by the electronic device 100. The network device 200 may change the above-described communication mode in response to a change of the environment of communication with the electronic device 100.

In step 405, the electronic device 200 determines whether information related to starting CS service processing is received. If the information is not received, the process proceeds to step 415. If the information is received, the network device 200 changes the communication mode (e.g., rank 2->rank 1 of the electronic device 100, in step 407. Alternatively, the network device 200 may maintain the communication mode (e.g., rank 1or SFBC) of the electronic device 100.

In step 409, the electronic device 200 determines whether information related to completion of CS service processing is received. If the information is not received, the network device 200 determines whether registration of the electronic device 100 is cancelled (e.g., the electronic device 100 is turned off or is outside a coverage area), in step 411. If the registration is not cancelled, the process returns to step 407, and steps 407 and 409 are re-performed. If the registration of the electronic device 100 is cancelled, the network device 200 terminates communication service support related to the electronic device 100.

If the information related to the completion is received in step 409, the network device 200 recovers the communication mode changed (e.g., rank 1->rank 2), in step 413. The network device 200 determines whether the registration of the electronic device 100 is cancelled, in step 415. If the registration of the electronic device 100 is cancelled, the network device 200 terminates the communication service support for the electronic device 100 in relation to the cancellation of the registration. If the registration of the electronic device 100 is not cancelled, the process returns to step 403 to re-perform the above-described steps.

According to various embodiments of the present disclosure, the network device 200 may receive the CQI/RI information together with or separately from information related to starting CS service processing or information related to completion of CS service processing. The network device 200 may control the change of the communication mode (e.g., a TM or rank change) of the electronic device 100 based on the received CQI/RI information.

Figure 5:
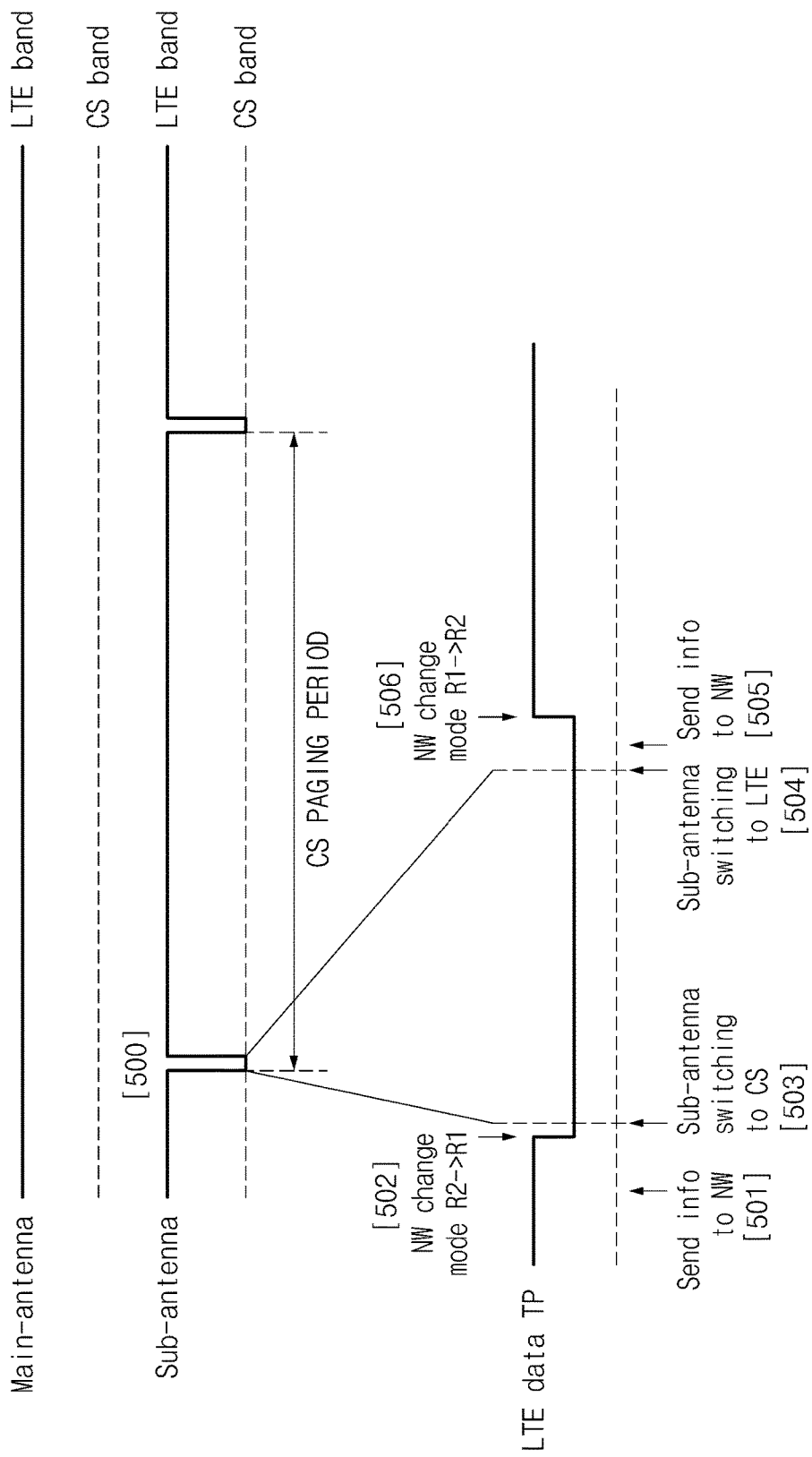
FIG. 5 is a diagram illustrating change of a communication mode of an electronic device that supports a first communication method, according to an embodiment of the present disclosure.

FIG. 5 is a diagram illustrating change of a communication mode of an electronic device that supports a first communication method, according to an embodiment of the present disclosure.

Referring to FIG. 5, the electronic device 100 that supports the single radio type 1 may support the PS service (e.g., an LTE band communication service) using a main antenna (e.g., the antenna 164a). The electronic device 100 may support the PS service and the CS service using a sub antenna (e.g., the antenna 164b). Additionally or alternatively, the electronic device 100 may support data transmission using the main antenna. According to an embodiment of the present disclosure, the electronic device 100 may support the LTE communication service in an LTE rank 2 communication mode using the main antenna and the sub antenna. The electronic device 100 may support the CS service (e.g. CDMA communication) using the sub antenna.

According to various embodiments of the present disclosure, the electronic device 100 uses the sub antenna to process data of an LTE band in intervals other than an interval 500. The electronic device 100 uses the sub antenna to process data of a CS band in the interval 500. The electronic device 100 transmits, to the network device 200, communication information (e.g., at least one of radio resource use start information for the operation of the CS system, a radio resource use mode of the CS system, communication mode change request information, and data service control request information), at a time 501. Upon receiving corresponding information (e.g., communication information) from the electronic device 100, the network device 200 changes a communication mode (e.g., rank 2 (R2)-> rank 1 (R1) or SM mode -> SFBC mode), at a time 502. The electronic device 100 switches a communication module (e.g., the first communication system module 171 -> the second communication system module 173 or switching to a communication system module for the operation of the CS system) of the sub antenna, at a time 503. The electronic device 100 operates the CS system (e.g., CS paging reception, measurement, or the like) during an interval between the time 503 and a time 504.

According to various embodiments of the present disclosure, the electronic device 100 switches the sub antenna (e.g., the second communication system module 173 -> the first communication system module 171 or switching to a communication system module for processing LTE data), at the time 504. After the time 504, the electronic device 100 transmits, to the network device 200, at least one of radio resource use completion information, communication mode change request information, and data service control request information, at a time 505. After the time 505, the network device 200 changes the communication mode of the electronic device 100 (e.g., rank 1 (R1)-> rank 2 (R2) or SFBC mode -> SM mode), at a time 506.

In the above-described operation, the electronic device 100 may transmit, to the network device 200, the CQI/RI (rank 1) information or a specified indicator (e.g., the first indicator) in relation to data processing of the CS system. Transmission of corresponding information (e.g., indicator information) may be performed in consideration of a certain time before switching of the sub antenna, for example, a time taken to handle the change of the communication mode of the network device (e.g., about 8 msec). Furthermore, if the data processing of the CS system (e.g., CDMA paging monitoring or the like) is completed, the electronic device 100 may transmit, to the network device 200, the CQI/RI (rank 2) or a specified indicator (e.g., the second indicator) in relation to data processing of the LTE system.

Figure 6:
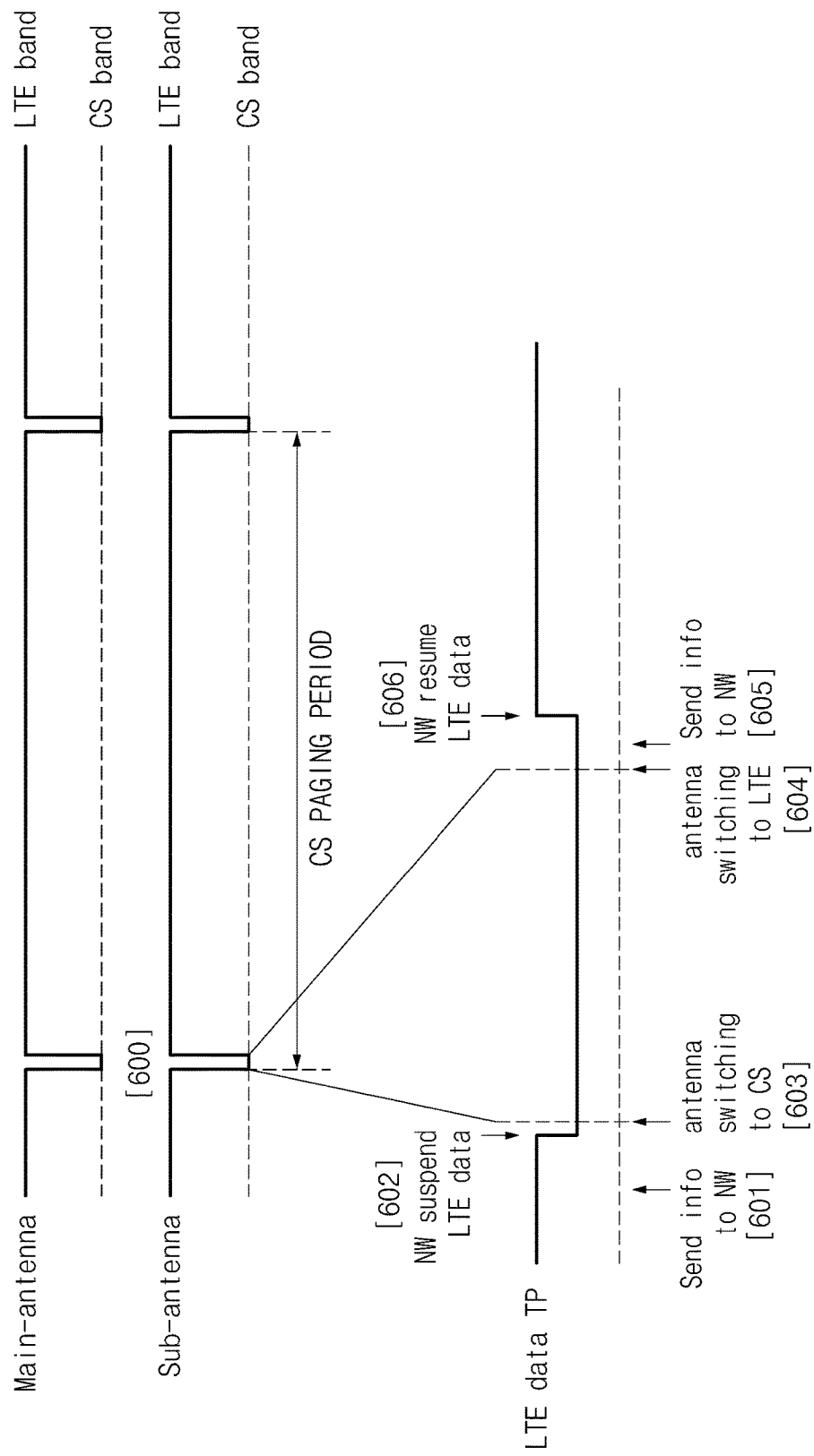
FIG. 6 is a diagram illustrating change of a communication mode of an electronic device that supports a second communication method, according to an embodiment of the present disclosure.

FIG. 6 is a diagram illustrating change of a communication mode of an electronic device that supports a second communication method, according to an embodiment of the present disclosure.

Referring to FIG. 6, the electronic device 100 may support the PS service (e.g., an LTE band communication service) and the CS service using the main antenna (e.g., the antenna 164a), and may support the PS service and the CS service using the sub antenna (e.g., the antenna 164b). Additionally or alternatively, the electronic device 100 may support data transmission using the main antenna. According to an embodiment of the present disclosure, the electronic device 100 may support the LTE communication service in the LTE rank 2 communication mode using the main antenna and the sub antenna. Furthermore, the electronic device 100 may support the CS service (e.g., a CDMA communication service such as registration or the like) using the main antenna and the sub antenna at a certain period.

According to various embodiments of the present disclosure, the electronic device 100 uses the main antenna and the sub antenna to process data of an LTE band in intervals other than an interval 600. The electronic device 100 uses the main antenna and the sub antenna to process data of a CS band in the interval 600. The electronic device 100 transmits, to the network device 200, communication information (e.g., at least one of radio resource use start information for the operation of the CS system, a radio resource use mode of the CS system, and data service control request information), at a time 601. Upon receiving corresponding information (e.g., the communication information) from the electronic device 100, the network device 200 suspends a communication mode (e.g., suspending transmission of data related to an LTE communication service), at a time 602. The electronic device 100 switches a communication module (e.g., the first communication system module 171-> the second communication system module 173 or switching to a communication system module for the operation of the CS system) of the main antenna and the sub antenna, at a time 603. The electronic device 100 processes data of a CS band using at least one of the main antenna and the sub antenna during an interval between the time 603 and a time 604.

According to various embodiments of the present disclosure, the electronic device 100 switches a communication module of the main antenna and the sub antenna (e.g., the second communication system module 173-> the first communication system module 171 or switching to a communication system module for processing LTE data), at the time 604. After the time 604, the electronic device 100 transmits, to the network device 200, at least one of radio resource use completion information and data service control request information, at a time 605. After the time 605, the network device 200 recovers the communication mode of the electronic device 100 (e.g., support an LTE communication service in a communication mode recorded in relation to the electronic device 100, for example, a rank 2 mode), at a time 606.

In the above-described operation, the electronic device 100 may transmit a specified indicator (e.g., the first indicator for indicating that the electronic device 100 supports the PS service and the CS service using the main antenna and the sub antenna and indicating a CS band process). Transmission of corresponding information (e.g., the specified indicator information) may be performed in consideration of a certain time before switching of the main antenna and the sub antenna, for example, a time taken to handle the change of the communication mode of the network device (e.g., about 8 msec). Furthermore, if the data processing of the CS band (e.g., CDMA paging monitoring or the like) is completed, the electronic device 100 may transmit, to the network device 200, a specified indicator (e.g., the second indicator) in relation to data processing of the LTE band. Alternatively, the electronic device 100 may perform data transmission/reception in relation to an LTE service.

As described above, the electronic device 100, based on a specific communication method supporting the PS service and the CS service, may transmit an indicator to the network device 200 to notify a change of a CS service, and may process a CS service function according to the change of the CS service. In this operation, if the network device 200 receives the indicator from the electronic device 100, the network device 200 may change a TM, rank, or the like, or may suspend scheduling related to LTE data processing so that occurrence of an error related to the LTE data processing may be prevented.

Figure 7:
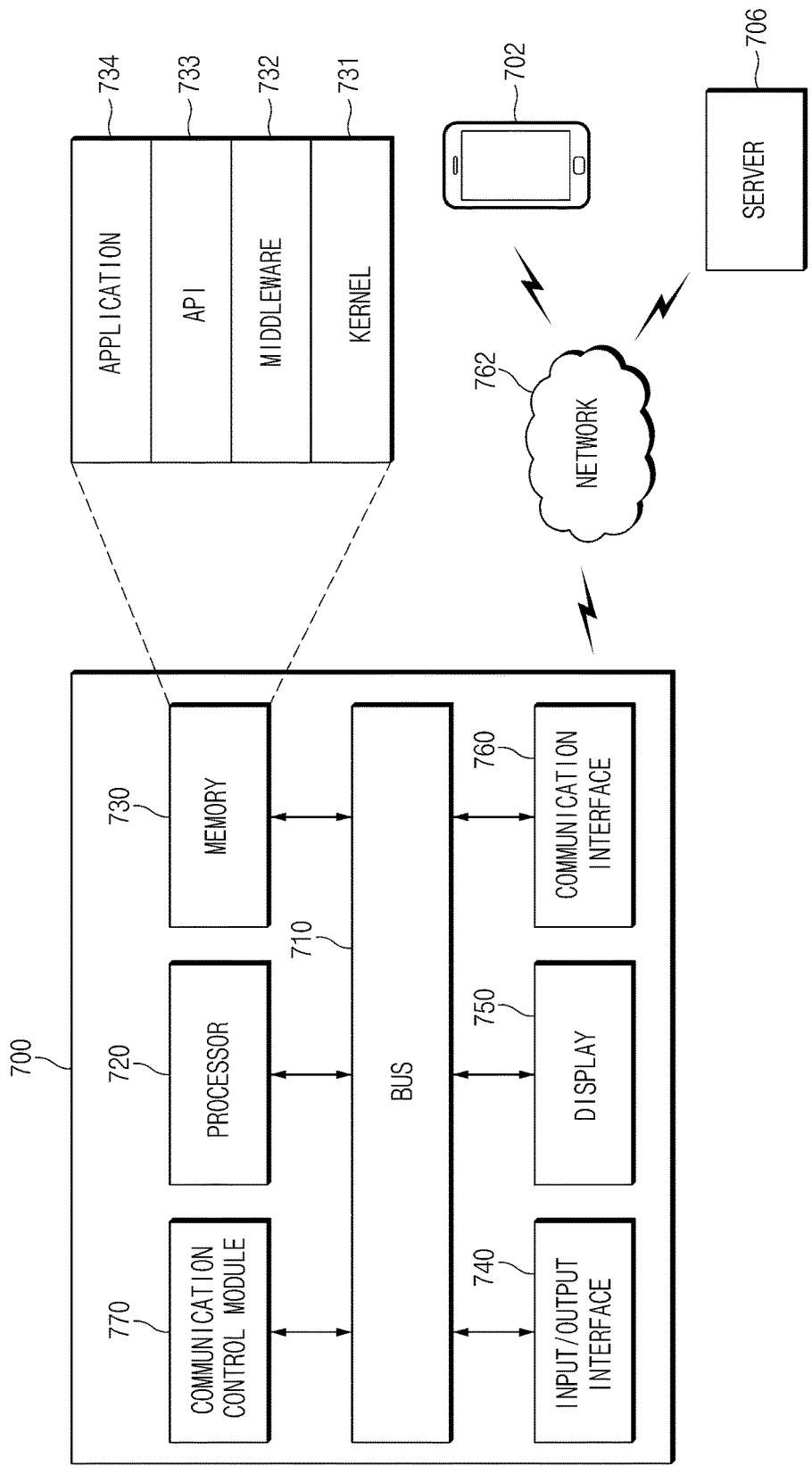
FIG. 7 is a diagram illustrating an electronic device environment supporting communication mode change, according to an embodiment of the present disclosure.

FIG. 7 is a diagram illustrating an electronic device environment supporting communication mode change, according to an embodiment of the present disclosure.

Referring to FIG. 7, an electronic device 700 may communicate with a server device 706 and another electronic device 702 via a network 762.

When accessing the network 762, the electronic device 700 may notify the network 762 that the electronic device 700 is a single-radio device so that the network may perform specific control on the electronic device. The network 762 may perform control only with information transmitted from the electronic device 700 at the time of switching radio resources, without information indicating the single-radio device. The CQI/RI may be used as the information transmitted from the electronic device 700 to the network 762. The electronic device 700 may transmit the CQI/RI information to the network 762 at a time outside of a predetermined period, and the network 762 may process the CQI/RI information received at an arbitrary time. A base station recognizes that the CS system of the electronic device 700 uses a radio resource if the RI is transmitted as rank 1 with reference to a CQI/RI value, and changes a transmission mode into the rank 1. Thereafter, if the RI is transmitted as rank 2, the base station changes the transmission mode again. According to various embodiments of the present disclosure, the electronic device 700 and the base station (e.g., the network 762 or the network device 200) may differentiate a normal case and a radio resource switching case using a specific indicator. The indicator may include radio resource use mode information for differentiating case 1 (in which radio resource use start information and radio resource use completion information are transmitted, and a communication mode of the electronic device 700 is changed between transmission of the radio resource use start information and transmission of the radio resource use completion information) and case 2 (in which the communication of the electronic device 700 is suspended between transmission of the radio resource use start information and transmission of the radio resource use completion information), and radio resource switching start/completion information. If the case 2 is used alone without differentiating the radio resource use mode, the electronic device 700 may transmit the radio resource switching start/completion information alone.

A time for transmitting the information (the CQI/RI information, the indicator, or the like) of the electronic device 700 may be determined in consideration of a time for the base station (e.g., the network 762 or the network device 200) to change a scheduling mode before radio resource switching of the electronic device 700. When a communication system module (e.g., the second communication system module 173) related to the CS service of the electronic device 700 is able to be aware of a radio resource use completion time in advance, the electronic device 700 may transmit specified information to the base station in advance. By virtue of this configuration, the communication system module related to the CS service of the electronic device 700 may support the base station so that the base station may change the scheduling mode in synchronization with the radio resource use completion time. When the communication system module is unable to be aware of the radio resource use completion time in advance, the electronic device 700 may transmit the specified information to the base station after the radio resource use is completed.

In the above-described operation environment of the electronic device 700 (or the electronic device 100), the network 762 may establish a communication channel between the electronic device 700 and the other electronic device 702. The network 762 may include, for example, network device elements related to establishment of a mobile communication channel. Alternatively, the network 762 may include network device elements related to establishment of an Internet communication channel. The network 762 may support data transmission/reception between the electronic device 700 and the other electronic device 702. Furthermore, the network 762 may support data transmission/reception between the electronic device 700 and the server device 706. According to various embodiments of the present disclosure, the network 762 may support at least one of the PS service or the CS service according to a communication support method of the electronic device 700.

The other electronic device 702 may establish a communication channel with a communication interface 760 of the electronic device 700. For example, the electronic device 702 may establish a short-range communication channel or a wired communication channel with the communication interface 760. According to an embodiment of the present disclosure, the other electronic device 702 may establish a Bluetooth communication channel or a Wi-Fi direct communication channel with the communication interface 760. According to various embodiments of the present disclosure, the other electronic device 702 may establish a communication channel with the electronic device 700 via the network 762. For example, the other electronic device 702 may include a cellular communication module, and may establish a mobile communication channel with the electronic device 700. Alternatively, the other electronic device 702 may include a Wi-Fi communication module, and may establish a Wi-Fi communication channel with the electronic device 700.

The electronic device 700 may establish a communication channel with at least one of the other electronic device 702 or the server device 706. The electronic device 700 may display, on a display, a screen related to other devices, communication channels to which have been established. A screen output from the electronic device 700 may be a video content screen. According to various embodiments of the present disclosure, the electronic device 700 may output an image collected by a camera. The electronic device 700 may selectively or alternately provide the PS service and the CS service. According to an embodiment of the present disclosure, the electronic device 700 may periodically perform paging monitoring related to support of the CS service, while providing the PS service. The electronic device 700 may be operated based on a single-radio multimode LTE communication method in relation to support of the PS service and the CS service. To this end, the electronic device 700 may have a communication module including one transmitter and a plurality of receivers.

Referring back to FIG. 7, the electronic device 700 includes a bus 710, a processor 720, a memory 730, an input/output interface 740, a display 750, the communication interface 760, and a communication control module 770. Additionally or alternatively, the electronic device 700 may further include an image collection module (e.g., a camera).

The bus 710 may be a circuit for connecting the above-described elements to each other and transferring communications (e.g., control messages, input events, data, or the like) between the above-described elements. For example, the bus 710 may transfer an input signal input through the input/output interface 740 to at least one of the processor 720 or the communication control module 770. The bus 710 may transfer CQI/RI information to the communication interface 760, or may transfer a specified indicator to the communication interface 760 as controlled by the communication control module 770.

The processor 720 may receive instructions from other elements (e.g., the memory 730, the input/output interface 740, the display 750, the communication interface 760, or the communication control module 770) through the bus 710. The processor 720 may interpret the received instructions, and may perform operations or process data according to the interpreted instructions. The processor 720 may include the communication control module 770 or may be separated from the communication control module 770, and may be configured to perform communication directly or via the bus 710. The processor 720 may support at least one of LTE band data processing or CS band data processing.

The memory 730 may store a command or data received from or generated by the processor 720, or another element (e.g., the input/output interface 740, the display 750, the communication interface 760, or the communication control module 770). The memory 730 includes programming modules such as a kernel 731, a middleware 732, an application programming interface (API) 733, and/or an application 734. Each programming module may include software, firmware, hardware, or a combination of at least two thereof.

The kernel 731 may control or manage system resources (e.g., the bus 710, the processor 720, or the memory 730) used to perform an operation or function of another programming module, for example, the middleware 732, the API 733, or the application 734. Furthermore, the kernel 731 may provide an interface for the middleware 732, the API 733, or the application 734 to access individual elements of the electronic device 700 in order to control or manage the elements.

The middleware 732 may serve as an intermediary between the API 733 or the application 734 and the kernel 731 so that the API 733 or the application 734 communicates and exchanges data with the kernel 731. Furthermore, the middleware 732 may perform a control operation (e.g., scheduling or load balancing) with respect to operation requests received from the application 734 by using, e.g., a method of assigning a priority for using system resources (e.g., the bus 710, the processor 720, or the memory 730) of the electronic device 700 to the application 734.

The API 733 may be an interface for allowing the application 734 to control functions provided by the kernel 731 or the middleware 732. The API 733 may include at least one interface or function (e.g., a command) for, for example, file control, window control, image processing, or character control.

According to various embodiments of the present disclosure, the application 734 may include a short message service/multimedia messaging service (SMS/MMS) application, an electronic mail application, a calendar application, an alarm application, a health care application (e.g., an application for measuring an amount of exercise or blood sugar), or an environment information application (e.g., an application for providing barometric pressure, humidity, or temperature information). Additionally or alternatively, the application 734 may be an application related to information exchange between the electronic device 700 and the other electronic device 702. The application related to information exchange may include, for example, a notification relay application for transferring specific information to the external electronic device or a device management application for managing the external electronic device.

For example, the notification relay application may include a function of transferring notification information generated by another application (e.g., an SMS/MMS application, an electronic mail application, a health care application, or an environment information application) of the electronic device 700 to the other electronic device 702. Additionally or alternatively, the notification relay application may receive notification information from the other electronic device 702 and may provide the notification information to a user. The device management application may manage (e.g., install, uninstall, or update) a function (e.g., turning on/off an external electronic device (or a component thereof) or adjusting brightness (or resolution) of a display) of at least a part of the other electronic device 702 communicating with the electronic device 700, an application operated in the external electronic device, or a service (e.g., a call service or a messaging service) provided from the external electronic device.

According to various embodiments of the present disclosure, if the other electronic device 702 is an MP3 player, the application 734 may include an application related to playback of music. For another example, if the other electronic device 702 is a mobile medical device, the application 734 may include an application related to health care. The application 734 may include an application related to a communication function (e.g., a message application, a chatting application, a voice call or video call application, or the like).

The input/output interface 740 may transfer a command or data input by a user through an input/output device (e.g., a sensor, a keyboard, or a touch screen) to the processor 720, the memory 730, the communication interface 760, or the communication control module 770, through the bus 710. For example, the input/output interface 740 may provide, to the processor 720 or the communication control module 770, an event of a touch input through the touch screen. Furthermore, the input/output interface 740 may output, through the input/output device (e.g., a speaker or a display), for example, the command or data received from the processor 720, the memory 730, the communication interface 760, or the communication control module 770, through the bus 710. According to various embodiments of the present disclosure, the input/output interface 740 may include a physical key button (e.g., a home key, a side key, or a power key), a jog key, a keypad, and the like. The input/output interface 740 may include a virtual keypad output to the display 750 as an input device.

According various embodiments of the present disclosure, the input/output interface 740 may perform a function related to audio processing. In detail, the input/output interface 740 may include one or more speakers and/or one or more microphones. For example, the input/output interface 740 may output, through the one or more speakers, audio data related to a screen output to the display 750 as controlled by the communication control module 770.

According to an embodiment of the present disclosure, the input/output interface 740 may output audio data received from the other network device 702 or the server device 706 connected to the network 762 through a communication function. For example, the input/output interface 740 may output audio data received through an LTE band or audio data received through a CS band. The input/output interface 740 may output audio data (e.g., a reception alarm) for reception of a call or a message. The audio data output from the input/output interface 740 may be skipped according to a user setting or whether the audio data output is supported by the electronic device 700.

The display 750 may display various information (e.g., multimedia data, text data, and the like). For example, the display 750 may output a lock screen, a home screen, a standby screen, or the like. The display 750 may output a specific function execution screen, such as, for example, a sound source playback screen, a video playback screen, a broadcast receiving screen, or the like. According to an embodiment of the present disclosure, the display 750 may output a screen corresponding to data based on a PS service (e.g., a specific webpage screen, a document output screen, an image output screen, a video output screen, or the like). Furthermore, the display 750 may output a screen corresponding to data based on a CS service (e.g., a message reception screen, a message display screen, a call reception notification screen, a call connection screen, or the like).

The communication interface 760 may establish a communication connection between the electronic device 700 and an external electronic device (e.g., at least one of the other electronic device 702 and the server device 706). For example, the communication interface 760 may be connected to the network 762 based on a wireless or wired communication technology so as to communicate with the external device. The wireless communication technology may include at least one of wireless fidelity (Wi-Fi), Bluetooth (BT), near field communication (NFC), global positioning system (GPS), or cellular communication (e.g., LTE, LTE-advanced (LTE-A), CDMA, wideband CDMA (WCDMA), universal mobile telecommunications system (UMTS), wireless broadband (WiBro), or global system for mobile communications (GSM). The wired communication technology may include at least one of universal serial bus (USB), high definition multimedia interface (HDMI), recommended standard 232 (RS-232), or plain old telephone service (POTS).

According to an embodiment of the present disclosure, the network 762 may be a telecommunications network. The telecommunications network may include at least one of a computer network, the Internet, the Internet of things, or a telephone network. According to an embodiment of the present disclosure, a protocol (e.g., a transport layer protocol, a data link layer protocol, or a physical layer protocol) for communication between the electronic device 700 and an external device may be supported by at least one of the application 734, the application programming interface 733, the middleware 732, the kernel 731, or the communication interface 760.

When the electronic device 700 supports a plurality of communication methods, a plurality of communication modules may be included in the communication interface 760. For example, the electronic device 700 may include a communication module for establishing a direct communication channel to the electronic device 702, such as a short-range communication module or a direct communication module. The short-range communication module or the direct communication module may include at least one of various communication modules, such as, for example, a Wi-Fi direct communication module, a Bluetooth communication module, a ZigBee communication module, and the like. The direct communication module may include a wired communication module such as a cable. According to an embodiment of the present disclosure, the communication interface 760 may receive video content from at least one of the electronic device 702 or the server device 706. The received video content may be stored or may be output to the display 750. According to various embodiments of the present disclosure, the communication interface may include one transmitter, two receivers, and a plurality of antennas.

The communication control module 770 may control the transmitter, the receiver, and the like included in the communication interface 760 so that data transmission/reception may be controlled according to a specified communication method. In relation to this operation, the communication control module 770 may include two communication system modules (e.g., a PS service supporting communication system module and a CS service supporting communication system module). The CS service supporting communication system module may use the communication interface 760 periodically or in response to a request from the electronic device 700. Information on a time at which the CS service supporting communication system module uses the communication interface 760 (e.g., a radio resource including a specified receiver and an antenna) may be directly exchanged with the PS service supporting communication system module. The CS service supporting communication system module may transfer radio resource use information to the PS service supporting communication system module whenever use of a radio resource is started or completed. According to an embodiment of the present disclosure, once the PS service supporting communication system module transfers state information to the CS service supporting communication system module, the CS service supporting communication system module may transfer corresponding information (e.g., resource use information or use time information) to the PS service supporting communication system module if the PS service supporting communication system module is in an active state.

The communication control module 770 may control information transfer and radio resource allocation between the PS service supporting communication system module and the CS service supporting communication system module. For example, the communication control module 770 may recognize state information of each system (the PS service supporting communication system module and the CS service supporting communication system module). If a radio resource use request is received from each system, the communication control module 770 may determine a system for which a radio resource is to be used and may assign a radio resource thereto according to a predetermined procedure. If the CS service supporting communication system module requires use of a radio resource while the PS service supporting communication system module is activated, the communication control module 770 may transfer information on this situation (information on use of a radio resource by the CS service supporting communication system module) to the PS service supporting communication system module.

Figure 8:
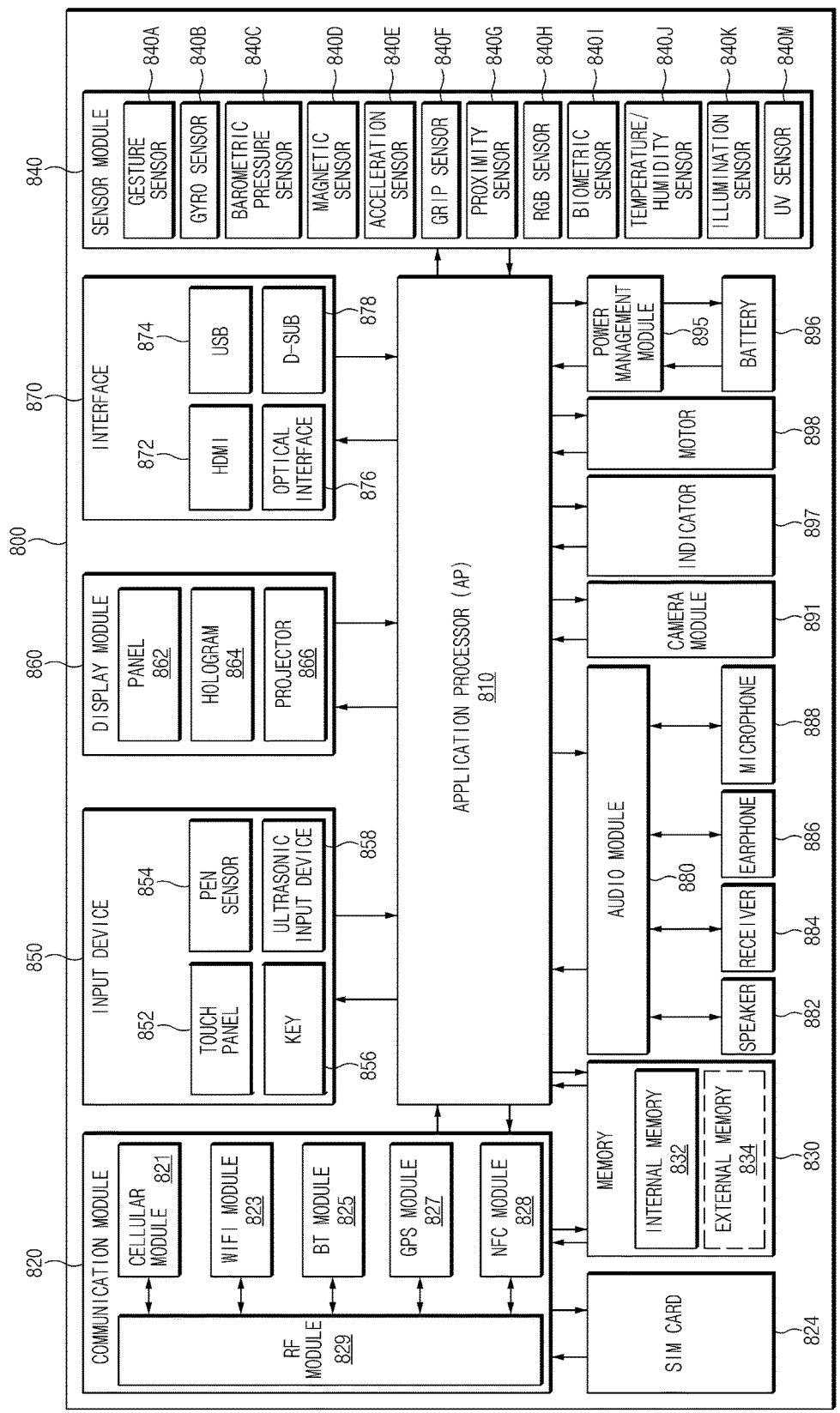
FIG. 8 is a block diagram illustrating an electronic device, according to an embodiment of the present disclosure.

FIG. 8 is a block diagram illustrating an electronic device, according to an embodiment of the present disclosure.

Referring to FIG. 8, an electronic device 800 may constitute, for example, a part or the entirety of the electronic device 100 of FIG. 1 or the electronic device 700 of FIG. 7. Referring to FIG. 8, the electronic device 800 includes at least one application processor (AP) 810 (e.g., the processor 720), a communication module 820 (e.g., the communication control module 170, the communication control module 770, the communication interface 160, or the communication interface 760), a subscriber identification module (SIM) card 824, a memory 830 (e.g., the memory 730), a sensor module 840, an input device 850 (e.g., the input/output interface 740), a display module 860 (e.g., the display 750), an interface 870, an audio module 880 (e.g., the input/output interface 740), a camera module 891, a power management module 895, a battery 896, an indicator 897, and a motor 898.

The AP 810 may run an operating system or an application program so as to control a plurality of hardware or software elements connected to the AP 810, may process various data including multimedia data, and may perform an operation thereon. The AP 810 may be implemented with, for example, a system on chip (SoC). According to an embodiment of the present disclosure, the AP 810 may further include a graphic processing unit (GPU).

The communication module 820 (e.g., the communication interface 760 or the communication control module 770) may perform data transmission/reception for communication between the electronic device 800 (e.g., the electronic device 100) and another electronic device (e.g., the other electronic device 702 or the server device 706) connected thereto through a network. According to an embodiment of the present disclosure, the communication module 820 includes a cellular module 821, a Wi-Fi module 823, a BT module 825, a GPS module 827, an NFC module 828, and an RF module 829.

The cellular module 821 may provide a voice call service, a video call service, a text message service, or an Internet service through a telecommunications network (e.g., an LTE, LTE-A, CDMA, WCDMA, UMTS, WiBro, or GSM network). Furthermore, the cellular module 821 may identify and authenticate electronic devices in the telecommunications network using, for example, a subscriber identification module (e.g., the SIM card 824). According to an embodiment of the present disclosure, the cellular module 821 may perform at least a part of those functions provided by the AP 810. For example, the cellular module 821 may perform at least a part of a multimedia control function.

According to an embodiment of the present disclosure, the cellular module 821 may include a communication processor (CP). The cellular module 821 may be implemented with, for example, an SoC. Although FIG. 8 illustrates that the cellular module 821 (e.g., a communication processor), the memory 830, and the power management module 895 are separated from the AP 810, the AP 810 may include at least a part of the foregoing elements (e.g., the cellular module 821), according to an embodiment of the present disclosure.

According to an embodiment of the present disclosure, the AP 810 or the cellular module 821 (e.g., a communication processor) may load, on a volatile memory, a command or data received from nonvolatile memories connected to the AP 810 and the cellular module 821, respectively, or at least one of the other elements, so as to process the command or data. Furthermore, the AP 810 or the cellular module 821 may store, in the nonvolatile memory, data received from or generated by at least one of the other elements.

Each of the Wi-Fi module 823, the BT module 825, the GPS module 827, and the NFC module 828 may include, for example, a processor for processing data transmitted/received through the modules. FIG. 8 illustrates that the cellular module 821, the Wi-Fi module 823, the BT module 825, the GPS module 827, and the NFC module 828 are separate blocks. However, according to an embodiment of the present disclosure, at least a part (e.g., two or more) of the cellular module 821, the Wi-Fi module 823, the BT module 825, the GPS module 827, and the NFC module 828 may be included in a single integrated chip (IC) or IC package. For example, at least a part (e.g., a communication processor corresponding to the cellular module 821 and a Wi-Fi processor corresponding to the Wi-Fi module 823) of the cellular module 821, the Wi-Fi module 823, the BT module 825, the GPS module 827, and the NFC module 828 may be implemented with a single SoC.

The RF module 829 may transmit/receive data, for example, RF signals. For example, a transceiver, a power amp module (PAM), a frequency filter, or a low noise amplifier (LNA) may be included in the RF module 829. Furthermore, the RF module 829 may further include a component such as a conductor or a wire for transmitting/receiving free-space electromagnetic waves in a wireless communication system. FIG. 8 illustrates that the cellular module 821, the Wi-Fi module 823, the BT module 825, the GPS module 827, and the NFC module 828 share the single RF module 829. However, according to an embodiment of the present disclosure, at least one of the cellular module 821, the Wi-Fi module 823, the BT module 825, the GPS module 827, or the NFC module 828 may transmit/receive RF signals through an additional RF module.

The SIM card 824 may be inserted into a slot formed at a specific location of the electronic device. The SIM card 824 may include unique identification information (e.g., an integrated circuit card identifier (ICCID)) or subscriber information (e.g., international mobile subscriber identity (IMSI)).

The memory 830 (e.g., the memory 730) may include an internal memory 832 or an external memory 834. The internal memory 832 may include at least one of a volatile memory (e.g., a dynamic RAM (DRAM), a static RAM (SRAM), or a synchronous DRAM (SDRAM)), or a non-volatile memory (e.g., a one-time programmable ROM (OTPROM), a programmable ROM (PROM), an erasable and programmable ROM (EPROM), an electrically EPROM (EEPROM), a mask ROM, a flash ROM, a NAND flash memory, or a NOR flash memory).

According to an embodiment of the present disclosure, the internal memory 832 may be a solid state drive (SSD). The external memory 834 may include a flash drive, for example, compact flash (CF), secure digital (SD), micro secure digital (Micro-SD), mini secure digital (Mini-SD), extreme digital (xD) or a memory stick. The external memory 834 may be functionally connected to the electronic device 800 through various interfaces. According to an embodiment of the present disclosure, the electronic device 800 may further include a storage device (or a storage medium), such as a hard drive.

The sensor module 840 may measure a physical quantity or detect an operation state of the electronic device 800 so as to convert measured or detected information into an electrical signal. The sensor module 840 includes at least one of a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (e.g., a red/green/blue (RGB) sensor), a biometric sensor 840I, a temperature/humidity sensor 840J, an illumination sensor 840K, or an ultraviolet (UV) sensor 840M. Additionally or alternatively, the sensor module 840 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, or a fingerprint sensor. The sensor module 840 may further include a control circuit for controlling at least one sensor included therein.

The input device 850 includes a touch panel 852, a (digital) pen sensor 854, a key 856, and/or an ultrasonic input device 858. The touch panel 852 may recognize a touch input using at least one of capacitive, resistive, infrared, and ultraviolet sensing methods. The touch panel 852 may further include a control circuit. When using the capacitive sensing method, a physical contact recognition or proximity recognition is allowed. The touch panel 852 may further include a tactile layer. In this case, the touch panel 852 may provide tactile reaction to a user.

The (digital) pen sensor 854 may be implemented in a similar or same manner as that for receiving a touch input of a user, or may be implemented using an additional sheet for recognition. The key 856 may include, for example, a physical button, an optical button, or a keypad. The ultrasonic input device 858, which is an input device for generating an ultrasonic signal, may enable the electronic device 800 to sense a sound wave through a microphone 888 so as to identify data. The ultrasonic input device 858 is capable of wireless recognition. According to an embodiment of the present disclosure, the electronic device 800 may use the communication module 820 to receive a user input from an external device (e.g., a computer or a server) connected to the communication module 820.

According to various embodiments of the present disclosure, the input device 850 may support event occurrence in a first display area. For example, the input device 850 may support generation of a hovering event, a touch event, or the like related to a scrolling motion on the first display area.

The display module 860 (e.g., the display 750) includes a panel 862, a hologram device 864, and/or a projector 866. The panel 862 may be, for example, a liquid crystal display (LCD), an active-matrix organic light-emitting diode (AM-OLED) display, or the like. The panel 862 may be, for example, flexible, transparent or wearable. The panel 862 and the touch panel 852 may be integrated into a single module. The hologram device 864 may display a stereoscopic image in a space using a light interference phenomenon. The projector 866 may project light onto a screen so as to display an image. The screen may be disposed in the inside or the outside of the electronic device 800. According to an embodiment of the present disclosure, the display module 860 may further include a control circuit for controlling the panel 862, the hologram device 864, or the projector 866.

The display module 860 may display a status indicator indicating a communication method of an electronic device. For example, the display module 860 may display at least one of a status indicator corresponding to a PS service supporting state or a status indicator corresponding to a CS service supporting state.

The interface 870 includes a HDMI 872, a USB 874, an optical interface 876, and/or a D-sub 878. The interface 870 may be included in the communication interface 160 illustrated in FIG. 1 or the communication interface 760 illustrated in FIG. 7. Additionally or alternatively, the interface 870 may include, for example, a mobile high-definition link (MHL) interface, an SD card/multi-media card (MMC) interface, or an infrared data association (IrDA) interface.

The audio module 880 may convert a sound into an electrical signal or vice versa. At least a part of the elements of the audio module 880 may be included in the input/output interface 740 of FIG. 7. The audio module 880 may process sound information input or output through a speaker 882, a receiver 884, an earphone 886, or the microphone 888.

According to an embodiment of the present disclosure, the camera module 891 for shooting a still image or a video may include at least one image sensor (e.g., a front sensor or a rear sensor), a lens, an image signal processor (ISP), or a flash (e.g., an LED or a xenon lamp).

The power management module 895 may manage power of the electronic device 800. Although not illustrated, a power management integrated circuit (PMIC), a charger IC, or a battery gauge may be included in the power management module 895.

The PMIC may be mounted on an IC or an SoC semiconductor. A charging method may be classified into a wired charging method and a wireless charging method. The charger IC may charge a battery, and may prevent an overvoltage or an overcurrent from being introduced from a charger. According to an embodiment of the present disclosure, the charger IC may include a charger IC for at least one of the wired charging method and the wireless charging method. The wireless charging method may include, for example, a magnetic resonance method, a magnetic induction method or an electromagnetic method, and may include an additional circuit, for example, a coil loop, a resonant circuit, a rectifier, or the like.

The battery gauge may measure, for example, a remaining capacity of the battery 896 and a voltage, current, or temperature thereof while the battery is charged. The battery 896 may store or generate electricity, and may supply power to the electronic device 800 using the stored or generated electricity. The battery 896 may include, for example, a rechargeable battery or a solar battery.

The indicator 897 may display a specific state of the electronic device 800 or a part thereof (e.g., the AP 810), such as a booting state, a message state, a charging state, or the like. The motor 898 may convert an electrical signal into a mechanical vibration. Although not illustrated, a processing device (e.g., a GPU) for supporting a mobile TV may be included in the electronic device 800. The processing device for supporting a mobile TV may process media data according to the standards of digital multimedia broadcasting (DMB), digital video broadcasting (DVB), or media flow.

Each of the above-described elements of the electronic device, according to various embodiments of the present disclosure, may be configured with one or more components, and the names of the elements may be changed according to the type of the electronic device. The electronic device, according to various embodiments of the present disclosure, may include at least one of the above-described elements, and some elements may be omitted or other additional elements may be added. Furthermore, some of the elements of the electronic device, according to various embodiments of the present disclosure, may be combined with each other so as to form one entity, so that the functions of the elements may be performed in the same manner as before the combination.

The term "module", as used herein, may represent, for example, a unit including one or more combinations of hardware, software, and firmware. The term "module" may be interchangeably used with the terms "unit", "logic", "logical block", "component", and "circuit". A module may be a minimum unit of an integrated component or may be a part thereof. A module may be a minimum unit for performing one or more functions or a part thereof. A module may be implemented mechanically or electronically. For example, a module, according to various embodiments of the present disclosure, may include at least one of an application-specific integrated circuit (ASIC) chip, a field-programmable gate array (FPGA), or a programmable-logic device for performing some operations, which are known or will be developed.

According to various embodiments of the present disclosure, at least a part of the devices (e.g., modules or functions thereof) or methods (e.g., operations) described herein may be implemented as instructions stored in a computer-readable storage medium in the form of a programming module. When the instructions are performed by at least one processor (e.g., the processor 720), the at least one processor may perform functions corresponding to the instructions. The computer-readable storage medium may be, for example, the memory 730. At least a part of the programming module may be implemented (e.g., executed) by the processor 720. At least a part of the programming module may include, for example, a module, a program, a routine, sets of instructions, or process for performing at least one function.

According to various embodiments of the present disclosure, a memory or computer readable recording medium stores computer-readable instructions to be executed by at least one processor. The instructions are configured to perform operation of a communication service by driving a processor connected to the memory. The instructions are configured to perform at least one of transmitting, by a communication control module, at least one of an indicator and information related to operation of a circuit switching service, to a network device supporting a packet switching service, through a communication interface, and switching, by the communication control module, radio resources of the communication interface in relation to the operation of the circuit switching service.

The computer-readable recording medium may include a magnetic medium such as a hard disk, a floppy disk and a magnetic tape, an optical medium such as a compact disk read only memory (CD-ROM) and a digital versatile disc (DVD), a magneto-optical medium such as a floptical disk, and/or a hardware device configured to store and execute program instructions (e.g., a programming module), such as a ROM, a RAM, a flash memory, or the like. The program instructions may include machine language codes generated by compilers and high-level language codes that can be executed by computers using interpreters. The above-described hardware may be configured to be operated as one or more software modules for performing operations of various embodiments of the present disclosure and vice versa.

The module or programming module, according to various embodiments of the present disclosure, may include at least one of the above-described elements, or some elements may be omitted or other additional elements may be added. Operations performed by the module, the programming module, or the other elements may be performed in a sequential, a parallel, an iterative, or a heuristic way. Furthermore, some operations may be performed in another order or may be omitted, or other operations may be added.

According to a communication service operating method and an electronic device according to various embodiments of the present disclosure, when an electronic device operates a specific communication service, occurrence of an error in another communication service may be prevented.

Furthermore, according to various embodiments of the present disclosure, since an appropriate communication mode is selected or a previous communication mode is suspended according to operation conditions of a communication service, the communication service may be operated stably.

Embodiments of the present disclosure have been shown and described. It will be understood by those skilled in the art that various changes in form and detail may be made therein without departing from the spirit and scope of the disclosure as defined by the appended claims.

What is claimed is:

1. An electronic device comprising:
 a communication interface configured to support operation of a radio resource; and
 a communication control circuit comprising:
  a first communication system circuit supporting a packet switching service, and
  a second communication system circuit supporting a circuit switching service,
 wherein the second communication system circuit is configured to transfer radio resource use start information related to the circuit switching service and radio resource use completion information related to the circuit switching service to the first communication system circuit, and the first communication system circuit is configured to transmit the radio resource use start information and the radio resource use completion information to a network device supporting the packet switching service, and wherein the communication control circuit is further configured to:
transmit, by the first communication system circuit, the radio resource use start information to the network device supporting the packet switching service when the first communication system circuit receives the radio resource use start information from the second communication system circuit, and downgrade a rank of the packet switching service, and
transmit, by the first communication system circuit, the radio resource use completion information to the network device supporting the packet switching service when the first communication system circuit receives the radio resource use completion information from the second communication system circuit, and upgrade the rank of the packet switching service, and
wherein changing the rank of the packet switching service results in a change of a transmission mode.

2. The electronic device of claim 1, wherein the second communication system circuit transfers the radio resource use start information and the radio resource use completion information to the first communication system circuit in response to an active state of the first communication system circuit.

3. The electronic device of claim 1, wherein the communication control circuit is further configured to:
switch the radio resource for operation of the circuit switching service based on the second communication system circuit after the radio resource use start information is transmitted; or
switch a radio resource for operation of the packet switching service based on the first communication system circuit after the radio resource use completion information is transmitted.

4. The electronic device of claim 1, wherein the communication control circuit is further configured to request a suspended state of the packet switching service from the network device when the circuit switching service is used.

5. The electronic device of claim 1, wherein the communication interface comprises a transmitter and a first receiver that use a main antenna, and a second receiver that uses a sub antenna.

6. The electronic device of claim 1, wherein the communication control circuit is configured to stop using the packet switching service when a voice call based on the circuit switching service is operated.

7. A method for operating a communication service in an electronic device, the method comprising:
transmitting, by a communication control circuit of the electronic device, radio resource use start information related to a circuit switching service and radio resource use completion information related to the circuit switching service to a network device supporting a packet switching service through a communication interface; and
switching, by the communication control circuit, radio resources between the packet switching service and the circuit switching service based on the radio resource use start information and the radio resource use completion information,
wherein the communication control circuit comprises a first communication system circuit supporting the packet switching service, and a second communication system circuit supporting the circuit switching service,
wherein the second communication system circuit is configured to transfer the radio resource use start information and the radio resource use completion information to the first communication system circuit, and the first communication system circuit is configured to transfer the radio resource use start information and the radio resource use completion information to the network device, and
wherein switching the radio resources comprises:
transmitting, by the first communication system circuit, the radio resource use start information related to the circuit switching service to the network device supporting the packet switching service when the first communication system circuit receives the radio resource use start information from the second communication system circuit, and downgrading a rank of the packet switching service, and
transmitting, by the first communication system circuit, the radio resource use completion information related to the circuit switching service to the network device supporting the packet switching service when the first communication system circuit receives the radio resource use completion information from the second communication system circuit, and upgrading a rank of the packet switching service, and
wherein changing the rank of the packet switching service results in a change of a transmission mode.

8. The method of claim 7, wherein at least one of the radio resource use start information and the radio resource use completion information is transmitted to the network device in response to an active state of a communication system supporting the packet switching service.

9. The method of claim 7, wherein switching the radio resources further comprises at least one of:
switching a radio resource in relation to operation of the circuit switching service of the second communication system circuit after the radio resource use start information is transmitted; and
switching a radio resource in relation to operation of the packet switching service of the first communication system circuit after the radio resource use completion information is transmitted.

10. The method of claim 7, further comprises transmitting information for requesting a suspended state of the packet switching service to the network device when the circuit switching service is used.

11. The method of claim 7, further comprises stopping use of the packet switching service when a voice call based on the circuit switching service is operated.

* * * * *